US009031317B2

(12) United States Patent
Yakubovich et al.

(10) Patent No.: US 9,031,317 B2
(45) Date of Patent: May 12, 2015

(54) METHOD AND APPARATUS FOR IMPROVED TRAINING OF OBJECT DETECTING SYSTEM

(71) Applicants: Yury Yakubovich, Markham (CA); Ivo Moravec, Richmond Hill (CA); Yang Yang, Toronto (CA); Ian Clarke, North York (CA); Lihui Chen, Thornhill (CA); Eunice Poon, Markham (CA); Mikhail Brusnitsyn, North York (CA); Arash Abadpour, Toronto (CA); Dan Rico, Thornhill (CA); Guoyi Fu, Vaughan (CA)

(72) Inventors: Yury Yakubovich, Markham (CA); Ivo Moravec, Richmond Hill (CA); Yang Yang, Toronto (CA); Ian Clarke, North York (CA); Lihui Chen, Thornhill (CA); Eunice Poon, Markham (CA); Mikhail Brusnitsyn, North York (CA); Arash Abadpour, Toronto (CA); Dan Rico, Thornhill (CA); Guoyi Fu, Vaughan (CA)

(73) Assignee: Seiko Epson Corporation, Tokyo (JP)

( * ) Notice: Subject to any disclaimer, the term of this patent is extended or adjusted under 35 U.S.C. 154(b) by 205 days.

(21) Appl. No.: 13/621,974

(22) Filed: Sep. 18, 2012

(65) Prior Publication Data

US 2014/0079314 A1 Mar. 20, 2014

(51) Int. Cl.
*G06K 9/62* (2006.01)

(52) U.S. Cl.
CPC ............ *G06K 9/6219* (2013.01); *G06K 9/6227* (2013.01); *G06K 9/6254* (2013.01); *G06K 9/6256* (2013.01)

(58) Field of Classification Search
CPC ............................ G06K 9/6227; G06K 9/626
USPC ........................................................ 382/153
See application file for complete search history.

(56) References Cited

U.S. PATENT DOCUMENTS

2002/0159642 A1* 10/2002 Whitney ...................... 382/225
2005/0002562 A1* 1/2005 Nakajima et al. ............. 382/159
2008/0154820 A1* 6/2008 Kirshenbaum et al. ......... 706/20
2009/0282025 A1* 11/2009 Winter et al. ..................... 707/5
2012/0288186 A1* 11/2012 Kohli et al. .................. 382/159

OTHER PUBLICATIONS

Ardito, Marco. "Blender Wiki PDF Manual." pp. 28 and 723. 2010.*
Bramer, Max. "Principles of Data Mining." Chapter 6. Springer, 2007.*
Heisele, Bernd, Gunhee Kim, and Andrew J. Meyer. "Object Recognition with 3D Models." 2009.*
Kuo, Cheng-Hao, and Ramakant Nevatia. "Robust multi-view car detection using unsupervised sub-categorization." Applications of Computer Vision (WACV), 2009 Workshop on. IEEE, 2009.*
OpenGL. 1994. Silicon Graphics, Inc., Mountain View, CA, USA.*
"3D Model based Object Class Detection in an Arbitrary View", Pingkun Yan, Saad M. Khan, Mubarak Shah, School of Electrical Engineering and Computer Science, University of Central Florida. IEEE International Conference on Computer Vision (ICCV), Oct. 14-20, 2007.

(Continued)

*Primary Examiner* — Chan Park
*Assistant Examiner* — Geoffrey E Summers

(57) ABSTRACT

An adequate solution for computer vision applications is arrived at more efficiently and, with more automation, enables users with limited or no special image processing and pattern recognition knowledge to create reliable vision systems for their applications. Computer rendering of CAD models is used to automate the dataset acquisition process and labeling process. In order to speed up the training data preparation while maintaining the data quality, a number of processed samples are generated from one or a few seed images.

20 Claims, 16 Drawing Sheets

(56) References Cited

OTHER PUBLICATIONS

"CAD-Based Recognition of 3D Objects in Monocular Images", Markus Ulrich, Christian Wiedemann and Carsten Steger. Robotics and Automation, 2009. ICRA '09. IEEE International Conference May 12-17, 2009, (pp. 1191-1198).

"Object Recognition with 3D Models", Bernd Heisele, Honda Research Institute, Cambridge, USA, Gunhee Kim, Carnegie Mellon University, Pittsburgh, USA, Andrew J. Meyer, Massachusetts Institute of Technology, Cambridge, USA, Jan. 2009, (pp. 1-11).

"Using Specularities in Comparing 3D Models and 2D Images", Elsevier, Margarita Asadchy, David Jacobs, Ravi Ramamoorthi and David Tucker, May 28, 2008, (pp. 1-53).

"Viewpoint-Independent Object Class Detection using 3D Feature Maps", Joerge Liebelt, IW-SI, EADS Innovation Works, Munich, Germany, Cordelia Schmid, Lear, INRIA Grenoble, Montbonnot, France, Klaus Schertler, IW-SI, EADS Innovation Works, Munich, Germany, IEEE 2008, Jun. 23-28, 2008.

"Histograms of Oriented Gradients for Human Detection", Navneet Dalal and Bill Triggs, INRIA Rhone-ALPS, Montbonnot, France, Proceedings of the 2005 IEEE Computer Society Conference on Computer Vision and Pattern Recognition, (CVPR '05), Jun. 20-26, 2005.

* cited by examiner

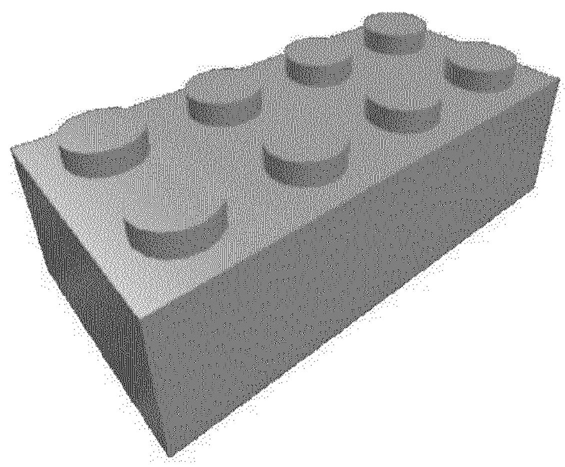
FIG. 6
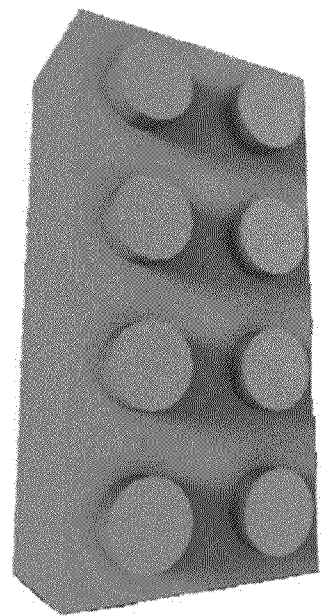
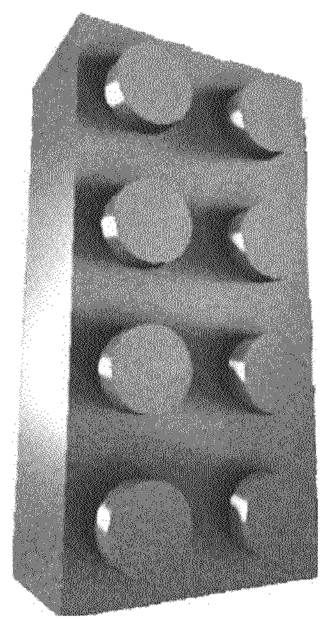
FIG. 7

FIG. 8

| Test Set | # of Images | Manual Training | | | | | | | |
|---|---|---|---|---|---|---|---|---|---|
| | | 3 Nodes (320x240 scale 0.95) | | | | 3 Nodes (160x120 scale 0.475) | | | |
| | | DR (%) | FA (%) | Runtime (ms) | Training Time (min) | DR (%) | FA (%) | Runtime (ms) | Training Time (min) |
| Good Set | 100 | 100 | 189 | 43 | Long: manual trial&error | 100 | 469 | 9 | Long: manual trial&error |
| Set 2 (cluttered) | 804 | 96.5 | 717.2 | 57 | | 97 | 1908 | 13 | |
| Set 4 (occluded) | 1000 | 77.2 | 1013 | 57 | | 83 | 2240 | 13 | |

| Test Set | # of Images | Automatic Training | | | | | | | |
|---|---|---|---|---|---|---|---|---|---|
| | | 8 Nodes (160x120 scale 1.0) | | | | 6 Nodes (160 x 120 scale 1.0) | | | |
| | | DR (%) | FA (%) | Runtime (ms) | Training Time (min) | DR (%) | FA (%) | Runtime (ms) | Training Time (min) |
| Good Set | 100 | 100 | 121 | 29 | 72 | 100 | 261 | 25 | 40 |
| Set 2 (cluttered) | 804 | 98 | 466 | 38 | | 96 | 619 | 32 | |
| Set 4 (occluded) | 1000 | 76 | 611 | 38 | | 74 | 767 | 32 | |

FIG. 18

METHOD AND APPARATUS FOR IMPROVED TRAINING OF OBJECT DETECTING SYSTEM

FIELD OF INVENTION

The present invention relates to object detection or object recognition and more specifically to training an object detector.

BACKGROUND

Object detection is an important problem in a variety of engineering and scientific disciplines such as computer vision, artificial intelligence, and biometrics. For example, in the many industrial settings today, robots are used for parts assembly and manufacturing. These robots are equipped with one or more cameras, e.g., CCD or CMOS, which give them vision. Often, objects (i.e., parts) are contained in a bin. The robot must recognize the object/part in the bin so it can pick it up to assemble the product. However, the object can be in any number of poses (position, orientation, rotation), under various lighting conditions, etc. So, the robot must be trained to recognize the part regardless of its pose and environment. As is known in the art, robots include software that attempts to identify the object from the camera image. Statistical learning and classification has been successfully used for some of such object detection applications.

In a real-world environment, the appearance of the object changes dramatically due to the change in view perspective, illumination, or deformation. As such, a single classifier cannot effectively detect objects whose appearance is subject to many changes. Classifier networks are general solutions based on the divide-and-conquer concept. The classifier networks must be trained to properly classify (detect, recognize) the particular object(s) of interest, such as an assembly line part. Generally, the process starts with an untrained network. A training pattern (e.g. images of the object in various poses and lighting conditions and possibly false target images) is presented to the network. The image signals are passed through the network to produce an output (for example, the result of classification, detection or measurement). The output results are evaluated and compared to optimal results and any differences are errors. This error can be a function of weights that are assigned to features of the object image, for example. Some features are better than others for recognizing the object and may be assigned a greater weight. The weights are iteratively adjusted to reduce the error and thus give greater confidence in the classification network. It is desirable to automatically train a classification network with minimum error, time, and effort.

In order to recognize an object in the images, the computer vision system should be initially trained on a digital representation of that object. Such digital representation involves modelling of the object and generation of a descriptor (or classifier) that could be applied to any image during runtime to find the target object. Creating or selecting of the appropriate classifier, as well as tuning of that classifier to ensure its robust performance during runtime, are driven by the application scenario, which could be acquired by (1) explicit user input, (2) existing geometrical model (such as CAD model) and (3) set of images captured in the target environment.

The images used for training and evaluation of the vision solution should represent possible appearances of the object in a real environment—if the classifier can recognize the target object in evaluation images, it should be able to successfully find it in any image during the runtime. In reality, capturing of the representative images to ensure that the system will reliably perform in normal operation is a great challenge and in most cases it is not practical to obtain them. Therefore, it takes a lot of human intuition and multiple interactions with the vision system users to address possible variations of environment such as noise, occlusions and lighting variations, and to create and tune the solution. In many cases, the users are not able to describe the factors affecting performance of their application in terms that could be effectively used for vision solution development and tuning. As a result, the researcher or image processing engineer has to modify the classifier or tune its parameters a number of times, based on failure cases during the system setup or operation.

Similar problems (difficulty to obtain user's prior knowledge and to collect images representing the problem across various environmental conditions) exist in other computer vision applications. For example, in machine vision inspection systems it is not always required to detect and recognize objects but is necessary to find abnormalities from the nominally good image. Variations of such abnormalities in the product under inspection compound with variation of ambient lighting, and, as a result, it is difficult for the users to define the requirements for their system. Consequently, it takes a number of iterations between the user and the vision system developer to create a vision solution and tune it for the required balance between falsely detected defects (false positives) and missed defects (false negatives).

Object detection algorithms typically require large datasets to adequately train the classifier network. In these datasets it is often necessary to have both positive and negative sample images. It is also necessary for samples that include the object to have been labelled with ground truth attributions (e.g. location, orientation, pose, etc). These visual ground truth annotations to the dataset are usually input manually by an operator that is observing the object when its image is taken by camera.

In general, the larger the dataset, the better the algorithm may be trained, which in turn leads to better detection results. However, large datasets require a long time to gather and are often not feasible to get manually as it could take days or weeks of labor to acquire and label the required number of images.

SUMMARY OF INVENTION

In the present invention, an adequate solution for computer vision applications is arrived at more efficiently and, with more automation, enables users with limited or no special image processing and pattern recognition knowledge to create reliable vision systems for their applications. In an embodiment, a method of the present invention for automatically generating a computer vision solution comprises: receiving user input for one or more descriptors; creating a training set of object images and an evaluation set of object images; and using a processor to: select a vision solution candidate that provides a best match to the user input from a predefined solutions library; train the selected solution candidate using the training set; apply the selected solution candidate to the evaluation set; evaluate the selected solution candidate solution using the user input; and use evaluation feedback for additional training of the selected solution candidate until accuracy and speed requirements are met or a maximum of additional training is reached.

In another embodiment, once the maximum of additional training is reached without meeting the accuracy and speed requirements, then new user input is received, or another candidate solution is selected from the predefined solutions library, or a new candidate solution is created, and the process is repeated to select and evaluate another or new solution. The creation of the new candidate solution may be automated based on scenario, object type, previous history performance, and/or the combination of information from other solutions.

In a further embodiment, the one or more descriptors comprises one or more of vision tasks, type of object and its properties, operation conditions of a system employing the computer vision solution, accuracy requirements, and speed requirements.

In yet another embodiment, the sample set for training and sample set for evaluation are created using one or more of explicit user input, an existing geometrical model, a set of images captured in a target environment, and computer generated object images.

In a further embodiment, computer rendering of CAD models is used to fully automate the dataset acquisition process and labeling process. These computer renderings simulate the object realistically enough for the purposes of the object detection algorithms training. Fully automating the dataset acquisition in this way has the benefit that even large datasets can be generated on demand in relatively little time with very little effort. More specifically, creating at least one of the training set of object images, and the evaluation set of object images comprises: obtaining characteristics of an object and parameters corresponding to each object characteristic; obtaining characteristics of a scene and parameters corresponding to each scene characteristic; obtaining characteristics of one or more (2D or 3D) camera(s); obtaining parameter domains for the object, scene, and camera characteristics; obtaining a target sampling schema by selecting a sampling type and a distribution type; and generating a plurality of sample configurations according to the target sampling schema using the parameter domains. For each sample configuration, this embodiment further comprises: performing 3D rendering of the scene using computer graphics, and generating a sample 2D image based on the rendering; and creating a data set comprised of the following for each sample configuration: one or more images, 3D data for each image if available, parameters of the sample configuration, and target object data.

In another embodiment, in order to speed up the training data preparation while maintaining the data quality, the present invention generates a number of processed samples from one or a few seed images. Specifically, creating at least one of the training set of object images and the evaluation set of object images comprises: acquiring a seed image of an object; rotating the seed image to generate a first rotated image; labeling the object in the first rotated image; rotating the first rotated image through a range of rotation angles to generate a plurality of additionally rotated images; and labeling the object in the additionally rotated images based on the label of the object in the first rotated image.

In a further embodiment, rotating comprises affine transformations.

In yet another embodiment, at least one of blurring, brightening, darkening, and noise is added to the first rotated image.

In a preferred embodiment, training of a selected solution candidate includes creating a Histogram of Gradient features (HOG) and defining cluster features, harvesting the nodes of the HOG that converge during training, and collecting the harvested nodes into a detector, wherein the detector defines a trained selection solution ready for evaluation.

The above solution for computer vision applications may also be implemented as a system for automatically generating a computer vision solution for a specified vision task, the system comprising: an input configured to receive user-defined limitations, wherein at least one of said user-defined limitations is associated with a sub-set of predefined descriptors within a library of predefined descriptors, each of said descriptors being associated with a respective set of image constraints; and processor configured to: for each user-defined limitation that is associated with said library of descriptors, selecting the best available descriptor within its associated sub-set of predefined descriptors most in harmony with all user-defined limitations; defining a working image library of sample images based on the user-defined limitations and the sets of image constraints associated with the selected descriptors; defining an evaluation set of sample images from said working image library; defining a vision solution candidate based on the user-defined limitations and the selected descriptors; tuning said vision solution candidate, including modifying the selected descriptors according to the specified vision task; evaluating the tuned vision solution candidate using said evaluation set of sample images and user-provided limitations, including accuracy and speed limitations; using evaluation feedback for additional tuning of the selected solution candidate until the accuracy and speed limitations are met or a maximum of additional tuning is reached.

Preferably, in this system, the tuning of the vision solution candidate further includes altering the selection of descriptors associated with a user-provided limitation.

The system may further include defining a training set of sample images from said working image library and excluding any sample images in the evaluation set of sample images, wherein: at least a portion of the descriptors within said library of descriptors include classifiers, and the tuning of the vision solution candidate includes training these classifiers for the specified vision task using said training set of sample images.

The system may also include defining a training set of sample images from said working image library and excluding any sample images in said evaluation set of sample images, wherein: at least one of said user-defined limitations requires the creation of a new classifier; the new classifier is automatically trained using the training set of sample images, the evaluation set of sample images, and user-defined inputs; and the defining of said vision solution candidate is further based on the new classifier.

In this case, the tuning of said vision solution candidate may further include creating additional new classifiers.

Also in this case, the automatic training of the new classifier preferably includes creating a Histogram of Gradient features (HOG) and defining cluster features, harvesting the nodes of the HOG that converge during training, and collecting the harvested nodes into a detector, said detector defining said new classifier.

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings, like reference symbols refer to like parts.

FIG. 6 shows an image of a sample LEGO-type block.

FIG. 7 illustrates variations in the appearance of the LEGO-type block of FIG. 6 due to variations in lighting and viewing angle.

FIG. 8 illustrates some sample images rendered using an image rendering method in accord with the present invention.

FIG. 18 tabulates the results of some experimental tests (with manual training and with automatic training).

DESCRIPTION OF THE PREFERRED EMBODIMENTS

Figure 1:
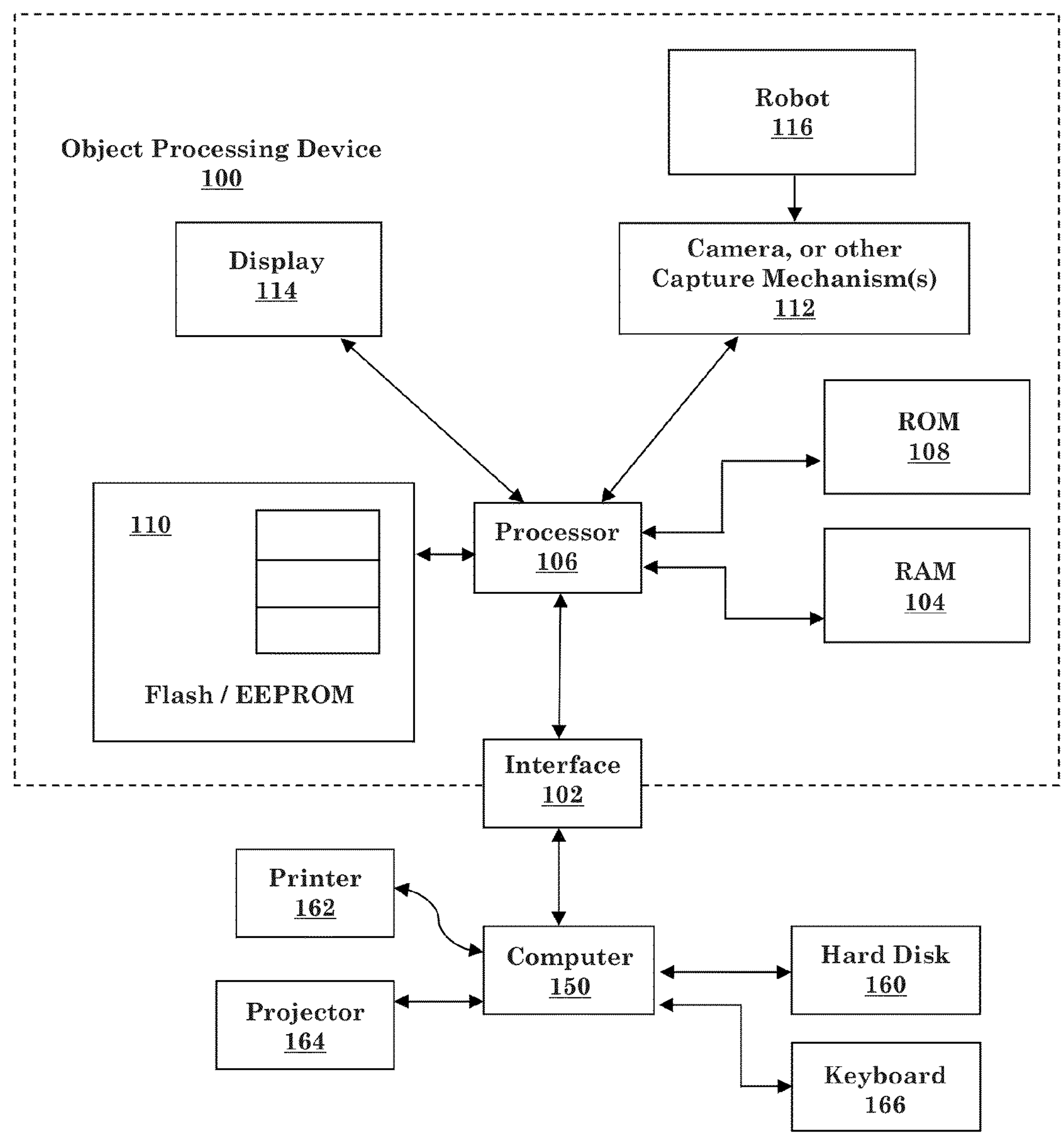
FIG. 1 is a general block diagram of an object processing device and system for utilizing the present invention.

In the following detailed description, reference is made to the accompanying drawings that show, by way of illustration, example embodiments of the invention. In the drawings, like numerals describe substantially similar components throughout the several views. These embodiments are described in sufficient detail to enable those skilled in the art to practice the invention. Other embodiments may be utilized and structural, logical and electrical changes may be made without departing from the scope of the present invention. Moreover, it is to be understood that the various embodiments of the invention, although different, are not necessarily mutually exclusive. For example, a particular feature, structure, or characteristic described in one embodiment may be included within other embodiments. The following detailed description is, therefore, not to be taken in a limiting sense, and the scope of the present invention is defined only by the appended claims, along with the full scope of equivalents to which such claims are entitled.

In general, example embodiments relate to methods, devices, and computer-readable media for training a classifier. Typically, training samples are examined within the feature space, and grouped together to train classifier nodes. These training samples for visual applications are usually images, particularly digital images of one or more objects. There are multiple ways of training classifier nodes. For instance, if the building of a classifier is driven by the samples in a "discriminative way", errors that might occur during the grouping process are addressed by moving the rejected samples to train a sibling node, or are simply removed. Alternatively, if the classifier is being built by a "generative" method, a number of features (such as corners and/or contour features) may be used to create a model, and then train training and evaluation set(s) may be used to tune and validate the model.

A schematic representation of an example object processing device 100 is shown in FIG. 1. The object processing device 100 exchanges data with a host computer 150 by way of an intervening interface 102. Application programs and an object processing device driver may also be stored for access on the host computer 150. When an image retrieve command is received from the application program, for example, the object processing device driver controls conversion of the command data to a format suitable for the object processing device 100 and sends the converted command data to the object processing device 100. The driver also receives and interprets various signals and data from the object processing device 100, and provides necessary information to the user by way of the host computer 150.

When data is sent by the host computer 150, the interface 102 receives the data and stores it in a receive buffer forming part of a RAM 104. The RAM 104 can be divided into a number of sectors, for example through addressing, and allocated as different buffers, such as a receive buffer or a send buffer. Data, such as digital image data, can also be obtained by the object processing device 100 from the capture mechanism(s) 112, a flash memory and/or EEPROM 110, or the ROM 108. The capture mechanism(s) 112 can be a camera, for example, and generates a digital image by photographing one or more objects, such as a part to be used in manufacturing and/or assembly of a device such as a printer. This camera 112 can be user-controlled, for example, by a robot 116 or a human. Alternatively, camera 112 may be automatically controlled, for example, by computer 150. The digital image of the object(s) can then be stored in the receive buffer or the send buffer of the RAM 104 or any other suitable memory.

A processor 106 uses computer-executable instructions stored on ROM 108 or on flash/EEPROM 110, for example, to perform a certain function or group of functions, such as the method 200 (FIG. 2), method 300 (FIG. 3), method 400 (FIG. 4), and method 500 (FIG. 5), for example. Methods 200, 300, 400 and 500 will be discussed in greater detail later herein. Where the data in the receive buffer of the RAM 104 is a digital image, for example, the processor 106 can implement the methodological acts of the methods 200, 300, 400 and 500 on the digital image to extract features in the digital image and further analyze the image based on the extracted features. Further processing in an imaging pipeline may then be performed on the digital image before the image is displayed on a display 114, such as an LCD display for example, or transferred to the host computer 150, for printing on printer 162, projected with projector 164, or stored on hard disk 160, for example.

The example methods 200, 300, 400 and 500 and variations thereof disclosed herein can be implemented using non-transitory computer-readable media for carrying or having computer-executable instructions or data structures stored thereon. Such computer-readable media can be any available media that can be accessed by a processor of a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store program code in the form of computer-executable instructions or data structures and that can be accessed by a processor of a general purpose or special purpose computer. Combinations of the above should also be included within the scope of computer-readable media.

Computer-executable instructions comprise, for example, instructions and data that cause a processor of a general purpose computer or a special purpose computer to perform a certain function or group of functions. Although the subject matter is described herein in language specific to methodological acts, it is to be understood that the subject matter defined in the appended claims is not necessarily limited to the specific acts described herein. Rather, the specific acts described herein are disclosed as example forms of implementing the claims.

In an embodiment, methods 200, 300, 400 and 500 of the present invention described hereinafter are preferably performed by one or more processors in the object processing device 100 and/or computer 150 executing computer-executable instructions, programs, software, firmware, that are stored or loadable in memory in object processing device 100 and/or computer 150 and/or in accessible external memory. Computer 150 processors may include, for example, a central processing unit (CPU) and one or more graphical processing units (GPUs). The internal memory may include, for example, RAM and ROM. An I/O interface enables communication with a keyboard, mouse, and external memory such as hard disk 160, for example.

Examples of special purpose computers include image processing devices such as digital cameras (an example of which includes, but is not limited to, the Epson R-D1 digital camera manufactured by Seiko Epson Corporation headquartered in Owa, Suwa, Nagano, Japan), digital camcorders, projectors, printers, scanners, copiers, robot(ic) mechanisms/products, portable photo viewers (examples of which include, but are not limited to, the Epson P-3000 or P-5000 portable photo viewers manufactured by Seiko Epson Corporation), or portable movie players, or some combination thereof, such as a printer/scanner/copier combination (examples of which include, but are not limited to, the Epson Stylus Photo RX580, RX595, or RX680, the Epson Stylus CX4400, CX7400, CX8400, or CX9400Fax, and the Epson AcuLaser® CX11NF manufactured by Seiko Epson Corporation) or a printer/scanner combination (examples of which include, but are not limited to, the Epson TM-J9000, TM-J9100, TM-J7000, TM-J7100, and TM-H6000III, all manufactured by Seiko Epson Corporation) or a digital camera/camcorder combination.

For ease of understanding, the present invention can be divided into two aspects. A first aspect is Automated Vision Solution Training Using User Input and a second aspect is Automated Dataset Acquisition. These aspects will be discussed in order in the following sections.

Automated Vision Solution Training Using User Input

Computer vision systems must be trained to achieve a given vision task. This task may be to identify a predefined target object within an image, or to determine a target object's pose and/or orientation, and/or its relative position, etc. Vision solutions, which provide a means for identifying characteristic features within an image, may be used to achieve these tasks. For example, a classifier-type vision solution may provide a simple yes or no answer to a question, such as, "Is the target object in the image, or is the object within a specific quadrant of the image, or does the object of a left-side-view pose?" Alternatively, such classifier-type vision solution may provide a probability measure as an answer to a question, such as, "What is the probability of the target object being in the image, or within a specific quadrant of the image or of having a particular pose?"

Training a computer vision system typically makes use of a set of training images to generate a classifier that will accurately achieve the particular vision task. In generating the Vision Solution, a user would decide what characteristic(s) of the target object are important for the particular vision task, such as how to distinguish the target object from its background or other non-target object items. A selected characteristic could be as simple as the color of the target object. For example, in one manufacturing environment the target object might be the sole red part in a white bin. In order for a robot, for example, (or other computer vision system) to recognize whether the red part is in the bin, or not, the classifier need only classify a captured image as containing the color red, or not. However, even in this simple example, varying lighting conditions and position of the red part in the white bin could make it difficult to "see" the red part in some circumstances.

In a real-world industrial setting, it is often much more difficult for a user to pick the right characteristics of a target object for training to achieve a particular vision task. A real-world setting also requires that the user provide the training images with which to define the classifier. It can often be difficult to define a set of training images best suited for a particular vision task. As a result, the resultant classifier might not work well enough (i.e., it may render too many false positives or false negatives results). In this case, the user must go back and select another or different characteristic(s) and/or new or additional training images to train a new classifier(s). This is a very time consuming operation.

It should also be noted that vision systems seldom rely on "a" classifier but instead use a classifier network comprised of a number of different classification nodes, and each node may include a cascade of ensemble classifiers. Each ensemble (group) classifier may itself include more than one weak classifier.

In a system where classifiers are built in the "discriminative way", the present invention automates the training/defining of classifier(s) using user inputs to improve and accelerate the overall process. In a system where the classifiers are trained in the "generative" way, the present invention may be used to accelerate the definition of features from which to create a model.

Figure 2:
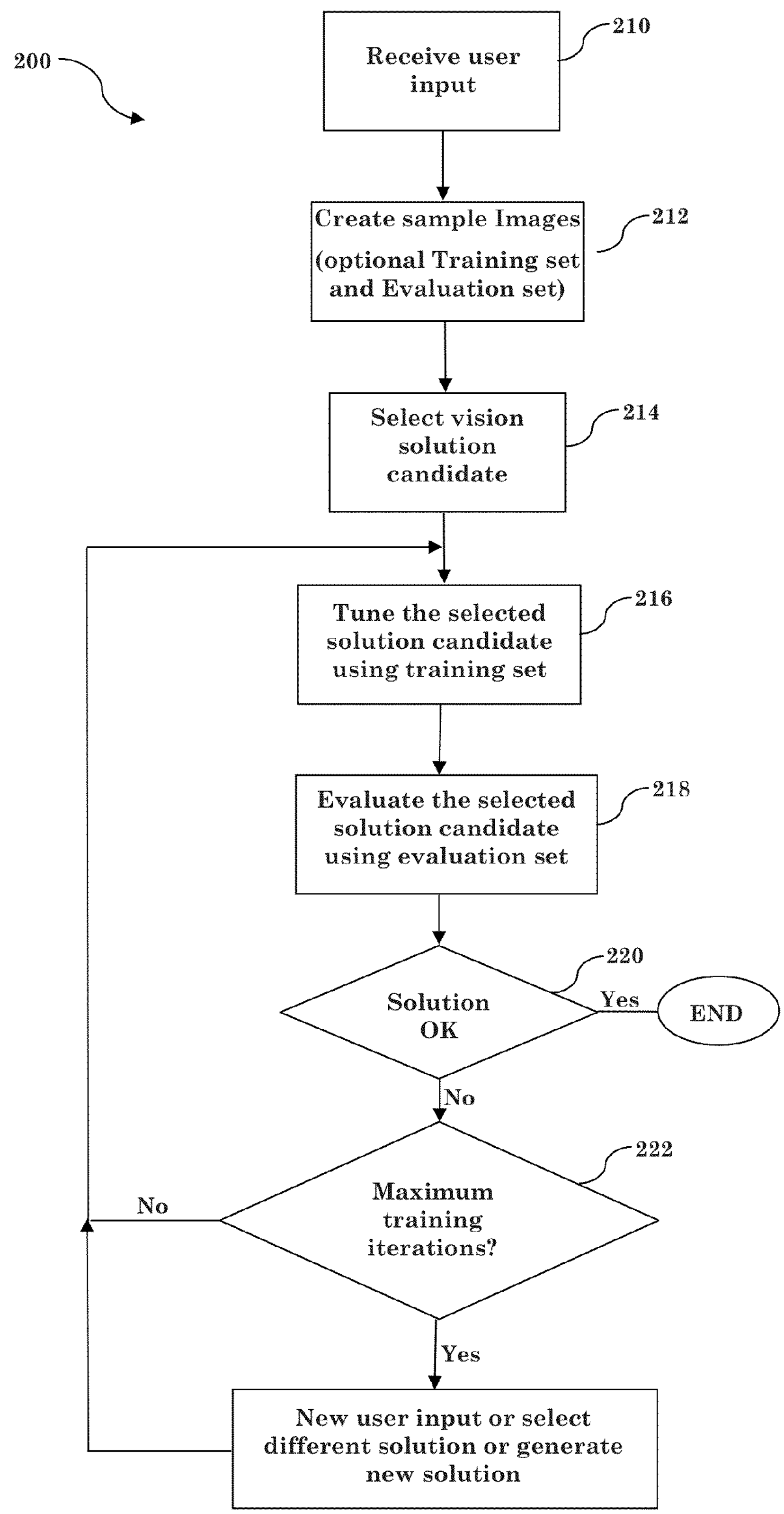
FIG. 2 is a flowchart of the general method of a first aspect of the present invention.

FIG. 2 shows general data processing modules (or steps) of a system (or method) 200 in accord with the "Automated Classifier Training Using User Input" aspect of the present invention. In module 210, user provided limitation inputs relating for a particular vision task are received or acquired. These limitations may be input via a graphics user interface, GUI, where the user may select from multiple predefined of limitation options and/or vision tasks and/or provide user-defined limitations/vision tasks not previously predefined. The user may also input certain criterion through keyboard 166 (FIG. 1) that is transferred to object processing device 100 through computer 150 and interface 102, for example. Alternately, user limitation inputs may be previously stored in memory such as ROM 108 or RAM 104 and acquired by processor 106.

The user limitation inputs may also further narrow the definition of a desired vision task. For example, if the desired vision task is to identify a box, then one limitation input might be to specify that the target object being sought has a cube shape of a particular color and having a surface with some specific characteristics, such as texture and reflectivity levels. Alternatively, if the vision task is to determine the pose (or orientation) of a target object, then the limitation inputs may include providing the specific shape of the target object, and specifying the desired posed position or specifying a number of poses to be sought. As another example, a limitation input may specify an area of an image relative to an identified reference (such as a predefined composite structure) where the target object should be located. This may be useful, for example, when the target object is one component of the composite structure, and it is known that the target object should be in the upper-right portion of the composite structure. In this manner, if the composite structure and its pose is identified, then the search for the target object can be narrowed to the composite structure's upper-right portion. Examples of user limitation inputs may include one or more or the following limitations:

- vision task(s), such as detection, classification, vision measurement
- orientation detection
- pose detection
- type(s) of object(s) and their properties
- background scenes
- target object class (i.e., the type/category of object, such as box, ball, washer, pencil, human face, etc.)
- operation conditions of the system
- accuracy requirements
- speed requirements.

These limitations may be presented to the user in a drop-down field, for example, such that a processing module (software and/or hardware) recognizes the limitations when it is input or acquired. A vision task represents the overall task of the vision system. This could be, for example, object detection in a robotic parts assembly line, part tracking to determine the location of the part, part inspection to determine if there are abnormalities, and/or pose determination. The type of object could specify what kind of part the user is looking for, e.g. print head, platen, ink cartridge, etc. These parts may be selected from a library in which identifying characteristics of each part are predefined and pre-described. Examples of such predefined identifying characteristic may include a part's the general size, shape, and outline, as well as its material characteristics such as deformation constraints, surface texture, and surface light reflectivity levels may be predefined. The predefined characteristic may further include a preferred pose position since the field-of-vision of the viewing camera may also be predefined, such as in a conveyer belt system. These predefined characteristic features may further be optionally altered by the operator to accommodate changes, such as for example in the color or material construct of the predefined part. The altered description may then be saved as a new predefined part type, and optionally added to a general category of similar parts. The operating conditions of the system could include, for example, lighting (e.g. fluorescent), camera (single or multiple), conveyor speed, etc. Accuracy (e.g. true positive detection vs. false positive detection) may be specified as, for example, 95% accuracy for critical tasks or 80% accuracy for less critical tasks, etc. The speed descriptor indicates how quickly the vision system must recognize the part.

The next step 212 is the creation of a set of sample images. This set may optionally be divided, if needed, into a training set and an evaluation set. Creation of a training set would be needed, for example, when an existing classifier needs to be tuned in on a particular characteristic shown in the training set, or when a new classifier needs to be defined. If set of sample images is not divided, then it may constitute one large evaluation set of images. Thus, the training set and the evaluation set are similar in that they comprise true samples (and/or optionally also contain false samples, appropriately labelled as such) of the target item(s) to be identified, i.e., the target object(s). In essence, the training set is used to train the system to differentiate the target item(s) within an image, and the evaluation set is used to test (i.e., evaluate) the performance of the system. In some cases, the training set and the evaluation set may be jointly constructed, and differ only in their application (i.e., training or evaluating). Alternatively, they can be separately defined for specific circumstances.

For example, the evaluation set(s) may be constructed by imaging (i.e., photographing/videographing) actual true and/or false samples in their intended use environment, while the training image might consist of predefined samples in a general environment or in a blank (or black or fixed) background. Alternatively, the training set may also include actual true and/or false samples in their intended use environment with the target items labelled within each training image to distinguish it from the background scene. Further alternatively, a portion of the samples in the training set may be set aside as the evaluation set or may be added to the evaluation set. Furthermore, when testing the system, any samples within the evaluation set that fail to be screened properly (i.e., render false positive or false negative results) may be added or moved to the training set, and the system may then be retrained to avoid such mistakes in the future.

The training sets may also come from one or more sources. For example, a user may input sample images that have been previously stored on hard disk 160, for example. Another source could be an existing geometrical model (e.g. a CAD model) that is used as a seed image to which computer graphics and/or image processing techniques are applied to generate (i.e., synthesize) new samples images having different lighting effects, color, textures, orientations, background scenes, sizes/proportions, etc. Another source could be a set of seed images captured by camera 112, which may be taken in the environment of the target vision system (e.g. assembly line). Computer graphics and/or image processing techniques are then applied to these seed images to generate new images having different poses, lighting effects, etc. Automated dataset acquisition (i.e., automated generation of a set of sample image) using seed images is described below.

The next module/step 214 is selection of a vision solution (or vision solution candidate) that best fits the user limitation inputs that were received in module/step 210. The vision solution candidate may be comprised of descriptors selected from a solutions library. Preferably, each limitation input is associated with one or more descriptors within the library in accordance with the type of limitation. A descriptor may be a predefined classifier (or a collection of predefined classifiers), or scene image samples (such as background image samples), etc. The descriptor classifiers may be designed for various types of lighting effects, colors, reflectivity levels, textures, etc. Since a limitation input may be associated with multiple descriptors, the descriptor selected for a given limitation is preferably the best available descriptor that harmonizes with the other limitation inputs. For example, if one limitation input defines the target object as being metallic, and another limitation input defines it as being "shiny", then the descriptor selected for the "shiny" limitation input may include a classifier defined to distinguish metallic reflectivity levels. These descriptors may be stored in memory, such as ROM 108, RAM 104, flash/EEPROM 110, hard disk 160, etc. Descriptors, and thus vision solutions, will be a function of the environment in which the present invention is utilized. However, some exemplary solutions are described below.

Solution #1: Color Feature Selection and Training

In this example solution the vision system has to recognize and report the location and orientation of a LEGO block in an image, as illustrated for example in FIG. 6. Assuming this particular LEGO block has a distinct red color, the user limitation inputs provided in module 210 may include specifying the target object as being an eight-connector, rectangular LEGO piece type, and having a red color. The LEGO piece type may be associated with descriptor that specifies a classifier for identifying such as a LEGO piece and/or classifiers identifying reflectivity levels. The red color limitation inputs would be associated with one or more descriptors that provide classifiers useful in distinguishing color and lighting variations. The following example focuses on the red color limitation.

Since color has been indicated as an important characteristic, color descriptor(s) [i.e., feature(s)] will be employed to facilitate the segmentation of the target object from its background.

Considering the true environment in which the present vision solution is to be implemented, although the lighting in a room may not change (i.e., it may be illuminated by standard fluorescent lamps) and a camera's field-of-vision (FOV) may not move, placing the LEGO block in various locations, distances and orientations under the camera would result in different appearances of the object. A reason for these differences in appearance is, for example, specular reflection which, depending on the object position in the camera's FOV, may cause portions of the object to become saturated in the image. Examples of such variations in appearance are illustrated in FIG. 7.

To select the color filter (or classifier) parameters, multiple object images at different locations in a defined field-of-view can be generated. Preferably, the images are generated by a computer graphics sample simulator, which included a lighting model of the specific room (or work environment) where the experiment has been performed (or where the workflow is to be conducted). This simulation preferably considers materials characteristics, reflections and shadows as they appear in the real image. Alternatively, the red color classifier may be predefined and combined with a predefined eight-connector LEGO piece classifier.

In an experimental application, after training of the color filter on the images generated by the sample simulator, actual LEGO blocks could be detected at any location in the work area.

Solution #2: Size and Scale Configuration

This solution first finds areas of activity in an input image. It then filters (i.e., classifies) these areas based on minimum and maximum size constraints. Then, these areas are run as queries against a database of object representations produced during training (or submitted to an appropriate target object classifier). One of the conditions for a model image to match a query image is the scale difference between the model image and the query image. The solution defines minimum and maximum scale constraints in order to avoid false detection of irrelevant objects. While the minimum and maximum size and scale constraints allow the solution to increase its accuracy, they are in practice significant parameters that need to be configured properly.

In this demonstration, the solution is given images that contain background and an object in a number of possible poses. The solution uses background modeling in order to detect the object. This step happens before the solution has been trained for the object. Using these detection results the solution decides what the proper bounds on size are. It also uses the object sizes measured at this stage to auto-configure the minimum and maximum scale constraints during training.

Using this strategy the employed solution automatically performs the needed configuration for size and scale. Alternatively, a human operator may enter the sizing constraints, or suggest starting constraint values as a starting point for the above-described method.

Solution #3: Background Modelling and Non-Uniformity Correction

Background modeling and non-uniformity correction solutions perform three tasks.

First, the solution models the static background and uses it to produce a map of active areas in the later stages of the operation. This operation allows the solution to lower instances of false detection caused by artifacts or irrelevant stationary objects in the scene.

In addition to the aforementioned procedure, the solution also models the lighting pattern of the scene by analyzing the intensities of the different areas of the static background image it takes before the objects of interest are added to the scene. This model allows the solution to compensate for the non-uniformities of the scene and to make solution parameters consistent throughout the visible area.

Finally, the result of non-uniformity background correction can be used in the process of feature selection as a negative training sample. By modeling, compensating and tracking sudden changes in lighting variations, the normalized background images provide an accurate negative sample image that ultimately will lead to performance improvements of a feedback solution.

The above described solutions to the object detection problem are just examples and one or more can be selected from the solutions library to train one or more classifiers in a classifier hierarchy. For example, if the user inputs color as a primary characteristic of the object to be detected, then the color feature selection solution may be selected to train a new classifier, or to tune pre-existing classifier. If size is another characteristic input by the user, then the size and scale may be selected to train/tune another classifier, perhaps as part of an ensemble of classifiers. If the background lends itself to modeling, this solution can be applied to train/tune yet another classifier in the ensemble. The present invention is not limited to any particular objects, or their characteristics, or detection solutions based on such characteristics. For example, in addition to color, size, and background, important characteristics may include shape and orientation. The present invention automatically selects the solution, in step 214, based on the user input.

The next module/step 216 in the present invention is to tune the selected vision solution candidate (from module 214) to define a selected solution candidate. This tuning may be a simple as setting various parameters of a descriptor (or classifier) to conform with the overall collection of limitation inputs, or it may require the use of training images to further tune a classifier or to define a new classifier. If training images are needed, then the training set from module 212 may be used.

The process of using data (i.e., training samples) to define a new classifier is referred to as training the classifier. There are many conventional protocols for training classifiers such as stochastic, batch, or on-line, and the present invention is not concerned with or limited by any particular training procedure or protocol. But a preferred method for automating the training of classifiers is described below.

The next module/step 218 in the present invention is to evaluate the selected solution candidate using the evaluation set (from module 212) and the received user limitation inputs (from module 210). For example, the results of this evaluation module may be compared to the performance limitations specified in module 212. Recall that accuracy and speed limitations can be input by the user. In module 218, the solution is evaluated to see if it meets one or both of these criteria, i.e., was the specified error rate met, and if so, was it met as quickly as specified. If the selected solution candidate is satisfactory (module/step 220=Yes), then the process ends and the selected solution candidate (such as a simple straight line classifier using one feature) can be used in the vision system for object detection, or tracking, or inspection, or pose determination, etc.

If the selected solution is not satisfactory (step 220, No), then the additional tuning can be applied to the selected solution, e.g. using additional images from the training set or using additional classifiers in the ensemble. This additional training continues until a maximum number of training iterations is met (module/step 222, Yes). This maximum number can be preset or input by the user as a criterion. If the maximum number is met, then the present invention will prompt the user to input new criteria on which the object recognition can be based. Alternately, the present invention will select an entirely different descriptor set from the solutions library. As a third alternative, the present invention will generate an entirely new classifier based on the training sample images from module 212 (or new training images emphasizing a desired characteristic feature), and that can be added to the solution library for future use. In all three cases, the process returns to tune and evaluate the different/new solution.

Figure 19:
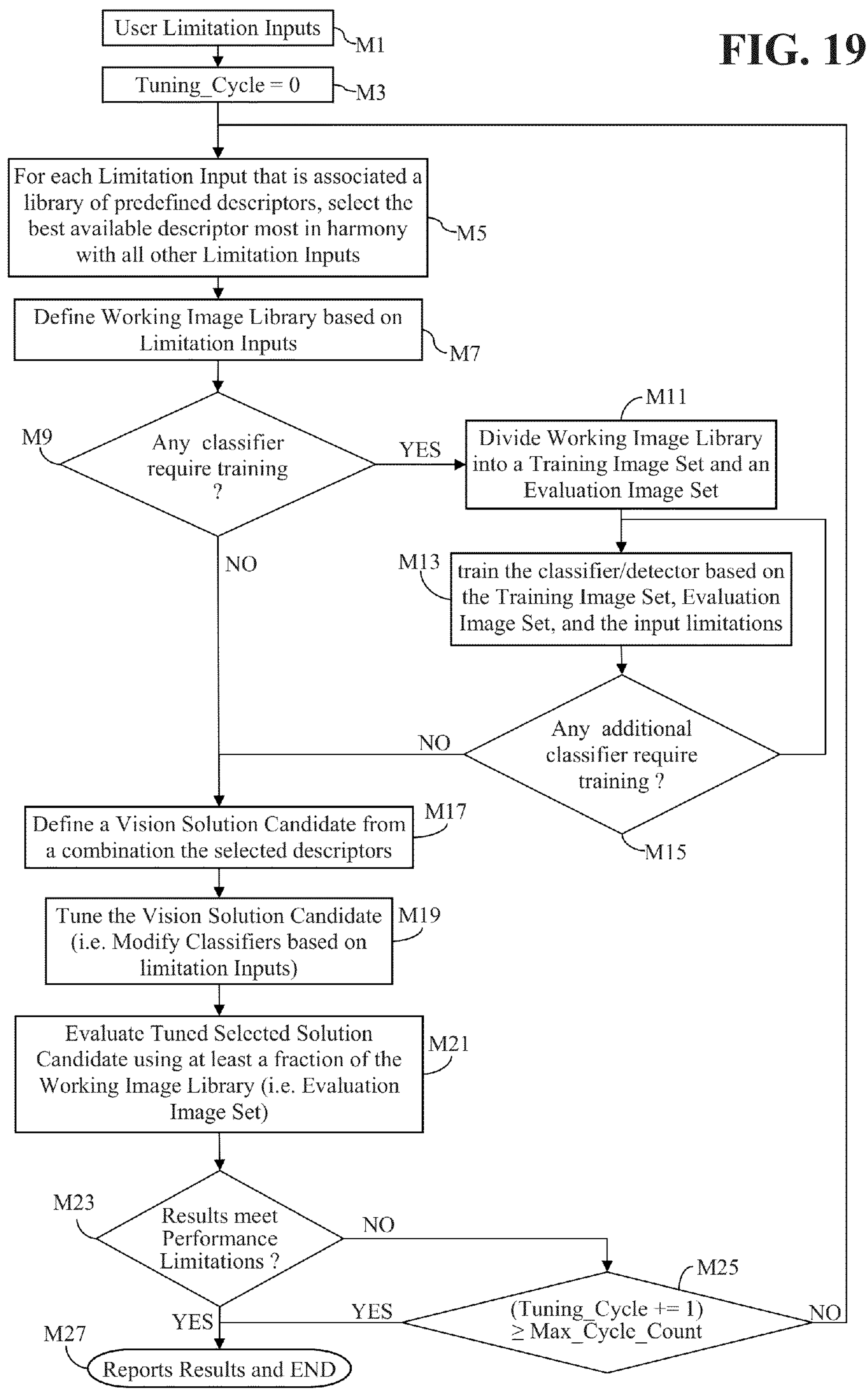
FIG. 19 provides another view of the present invention.
Figure 20:
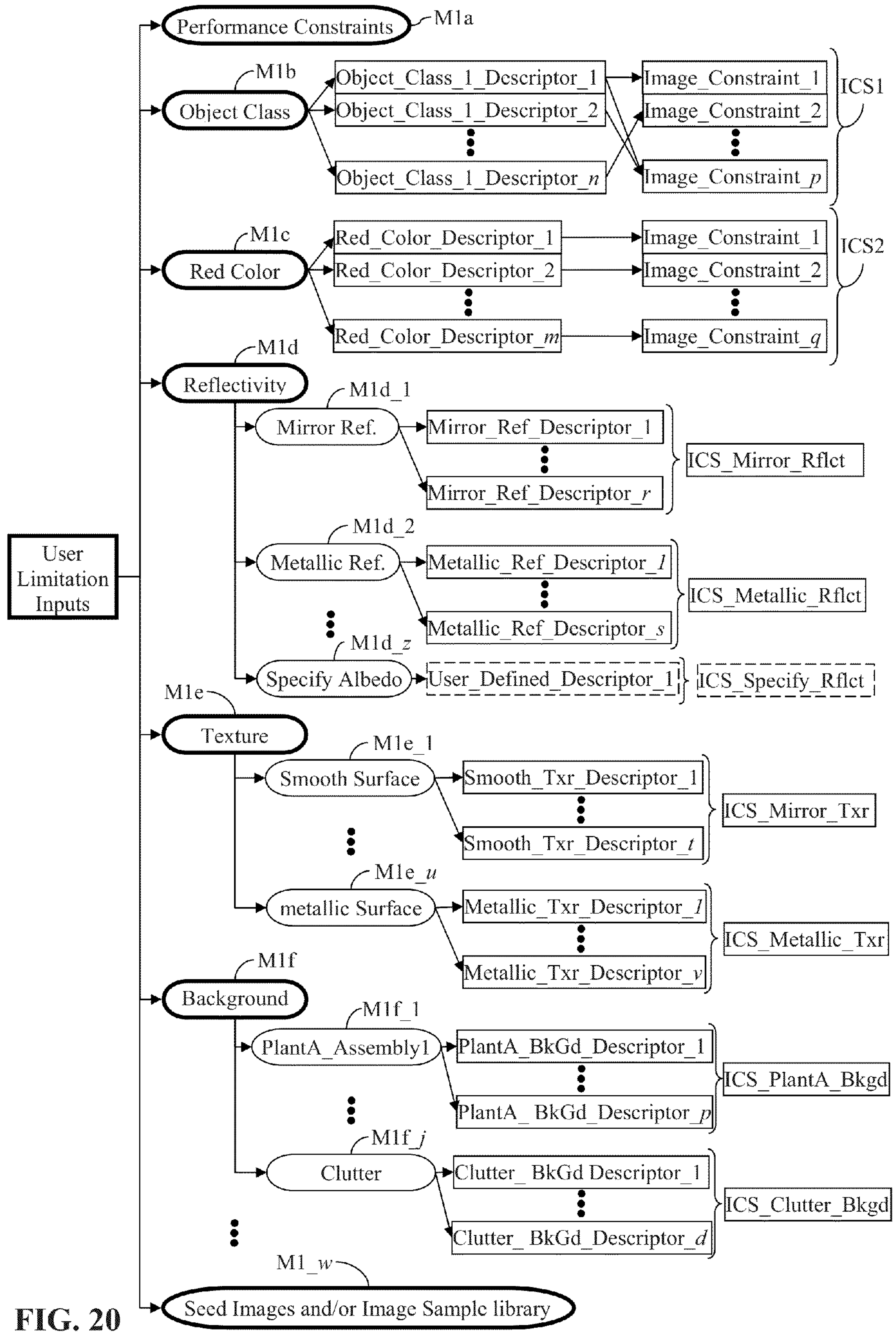
FIG. 20 provides some examples of user limitation inputs in accordance with the embodiment of FIG. 19.
Figure 21:
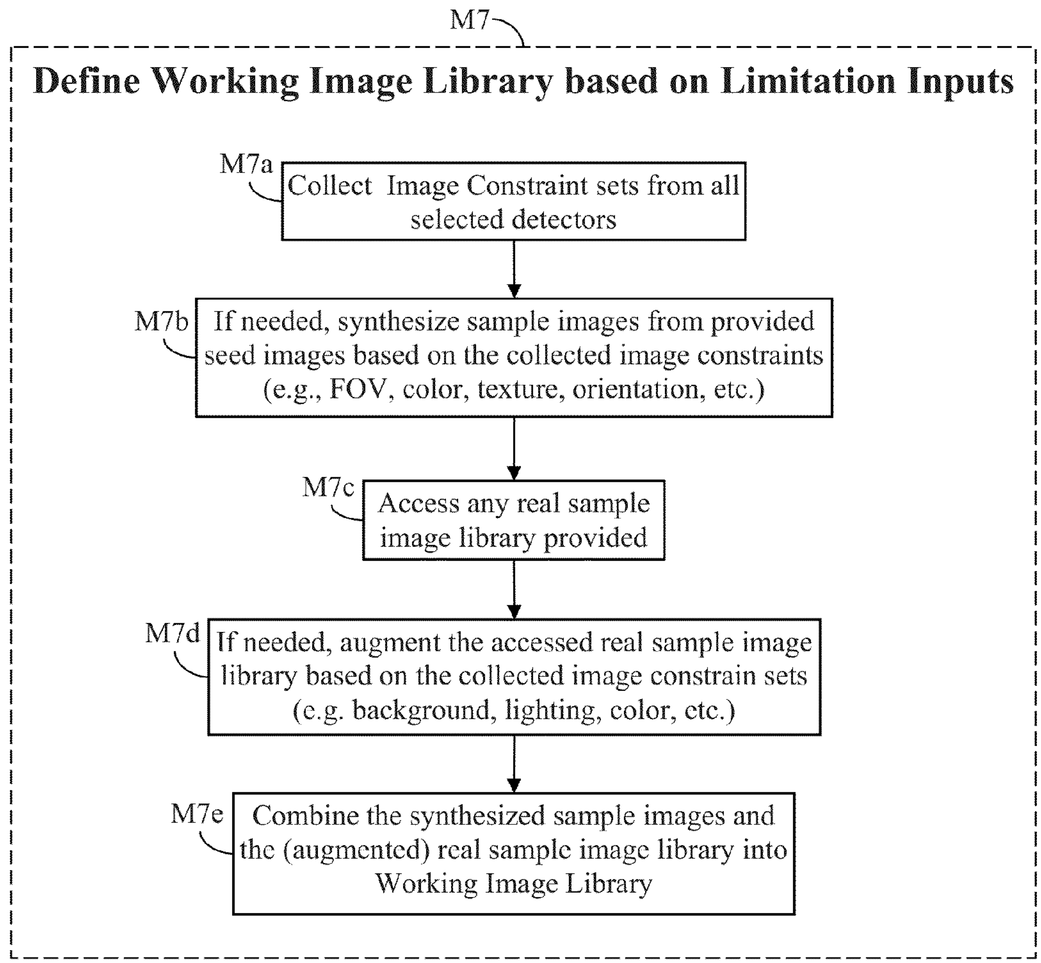
FIG. 21 provides an internal view of module M7 of FIG. 19.

FIGS. 19-21 provide other views of the present embodiment. Like in the case of FIG. 2, FIG. 19 again shows a system for automatically generating a computer vision solution comprised of multiple computer/data processing modules. An input module M1 is configured to receive (or access) one or more user-defined limitations. Examples of such limitation inputs are shown in FIG. 20.

With reference to FIG. 20, the user limitation inputs may be in the form of GUI offering various drop-down categories and sub-categories, and/or in the form of an input file (or library of files) or location (such as an URL) where the file(s) may be accessed locally or remotely. The limitation inputs will generally include performance constraints, as illustrated by sub-module M1a. The performance constraints may specify the minimum success rate and time constraints, if any. These performance limitations are used to evaluate the selected solution candidate, as is explained above.

Another limitation may specify the object class of a target object being sought, as illustrated by sub-module M1b. Examples of object classes may be a wrench, socket, ink cartridge, human face, automobile, car, truck, etc. Each object class will be associated with one or more descriptors (Object_Class_Descriptor_1 through Object_Class_Descriptor_n), which in this case may consist of one or more classifiers. Each descriptor will specify one or more image constraints. For example, an ink cartridge classifier may specify view angles as required image constraints. The collection of all image constraints for a given descriptor type is here termed an image constraint set. Thus, image_constraint_1 through image_constraint_p form image constraint set ICS1 for a given object class. This image constraints are used in case test images need to be generated for a given object class limitation.

As another example, a limitation input may specify a color, such as the color red (sub-module M1c). Again, multiple descriptors may be associated with the red color limitation, and each descriptor may be associated with one ore more image constraints, which define an image constraint set ICS2. An image constraint, for example, may simply specify that an image of a target object should show the target object in red. Additionally, some descriptors may be one, or more, classifiers trained to detect various shades of red. Other descriptors may be one or more classifier trained for detecting red under various lighting conditions. Still other descriptors may specify how the color varies with different types of surface textures. The selected descriptor, or selected combination of descriptors, may depend on which descriptors harmonize with other limitation inputs.

Sub-module M1d illustrates a reflectivity limitation. In this case, this limitation may bring up a list of reflectivity types to choose from or to specify a known reflectivity range, as illustrated by sub-modules M1d_1 through M1d_2. Use of reflectivity example choices permits a layman who may not be familiar with how reflectivity is defined or measured to still provide useful information in construction of a vision solution. For example, M1d_2 specifies a metallic reflectivity, and the system may provide multiple descriptors associated with this metallic reflectivity sub-module. For example, one descriptor may simply specify an albedo (reflectivity) measure range for this sub-module, while others may be one or more classifiers trained to detect such reflectivity on various types of surfaces. These descriptors will again specify an image constraint set (ICS_Mirror_Rfct).

As an added example, if a user specifies a metallic reflectivity, but in selecting an object class neglects to specify a material or surface type, the system will know to select descriptors associated with metallic surfaces, if available, in order to better harmonize the selected descriptors among the various limitation inputs.

For any given limitation, a user may also specify that a new descriptor needs to be constructed. This may be the case, for example, if the user defines specifies a new reflectivity range (sub-module M1d_z). In this case, the new descriptor may require construction/acquisition of a new classifier, which in turn may require generation of new training images in accordance with all the image constraint sets of all other limitation inputs and any additional image constrains specified. A newly specified image constraint, for example, may require that the new classifier be trained the specific target object shown in select sample images. This new descriptor may then be added to the descriptor library.

As another example, a user limitation input may specify texture, M1e. This again may bring up various options for different types of textures (M1c_1 to M1c_u) for which descriptors are predefined in the descriptor library.

Alternatively, a limitation input may specify a background, M1f. In this case, sub-modules may provide options for various known stages of one ore more known plants. For example, sub-module M1f_1 may specify a specific station within an assembly comprised of multiple stations (such as along a conveyer system) of a known manufacturing plant. In this case, the descriptors associated with M1f_1 may provide background images under various conditions, including artificial lighting, time of day, speed of assembly, camera types/conditions, etc. The background sub-module M1f may also be more general specifying types of background such as sparse, or cluttered (M1f_j), etc. Each sub-module may have one or more associated images for use the construction of sample images for training, tuning, and/or evaluation purposes. Alternatively, a user may submit custom background image/description, which may then be added to the library.

Input limitation may also include seed images and/or an image sample library, as illustrated by sub-module M1w. The seed images maybe include CAD file(s), real captured images, or a combination of both. From these seed images, the system may generate multiple additional images in accordance with individual image constraints provided by the individual selected descriptors of the other selected limitation inputs, or in accordance with the image constraint sets associated with other selected limitation inputs. Generation of sample images from seed images is described in more detail below.

Returning to FIG. 19, after module M1 acquires all the limitation inputs, module M3 may reset a count of tuning cycles. In the present embodiment, the system may repeat multiple tuning cycle in an effort to achieve desired performance results up to a predefined (or user-specified) maximum cycle count, illustrated in module M23 as Max_Cycle_Count.

As is explained above, some limitations are associated with one or more descriptor of a library of predefined descriptors. A descriptor may provide operating parameters and/or may define one or more classifiers. Therefore, for each limitation that is associated the library of predefined descriptors, module M5 selects the best available descriptor (or descriptors) most in harmony (i.e., most consistent or in line) with all other limitation inputs. If in one cycle, it is found that the system does not meet performance requirements, then the descriptor selection may be changed in the next cycle.

Module M7 then defines a working image library based on the limitation inputs. The working image library may include any user-provided library of sample images, or sample images generated from user-supplied (or selected) seed images. As is explained above, when the system generates an image, it takes into consideration the image constraint sets associated with the user inputs. These image constraints may specify how the images should be generated, included colors, textures, poses, size(s), positions, lighting effects, camera characteristics, backgrounds, etc. If any descriptor requires training samples, then this working image library may be divided into a training set of sample images and an evaluation set of sample images. Otherwise, the entire working image library may be used the evaluation set in later modules.

FIG. 21 provides a closer look at module M7 for defining the working image library. First, as indicated in sub-module M7*a*, the system collects the image constraint sets from all selected detectors. If any user input requires generation of synthetic sample images, such as if the user inputs seed images, then sub-module M7*b* would synthesize the sample images from the provided seed images based on the collected image constraints. This would take into account, for example, image constraints such as FOV, color, texture, orientation, lighting, backgrounds, etc., in the generation of the synthesized images. Sub-module M7*c* further accesses any real sample image libraries provided as input(s). Sub-module M7*d* then determines if any of the accessed sample libraries require augmentation in accordance with the image constraints. For example, specific colors may be added to sample objects within a sample image. Alternatively, if a sample image provides a black (or solid color) background, the background may be changed in accordance with those specified in the collected image constraints. As another example, specific lighting effects may be added to the sample images. Lastly, sub-module M7*e* combines the synthesized sample images and the real sample image libraries (with augmentations, if applicable) into the working image library.

Returning to FIG. 19, with the working image library thus constructed, module M9 determining if any classifier requires training. As stated above, descriptors may include one or more predefined classifiers. It may be determined a predefined classifier is a bit too general for a particular case, and that its further training for the specific vision task (i.e., explicit training with the target object) would improve its performance. In this case, the existing classifier might be subject to further training. Another case when a classifier needs training is if at the end of a current cycle, the system has not been able to meet the specified performance limitations and the system (or user) determines that a new classifier specially constructed for the current task would improve performance. Alternatively, a user-input limitation may explicitly require the creation of a new classifier. For example, if the user does not identify a suitable object class or type of object similar enough to the target object in mind, the user may select limitations requiring construction of a new classifier specially designed for the current vision task. Irrespective of the reason, if the system determines that classifier training is required, then module M11 divides the working image library (of image samples) into a training set (of image samples) and an evaluation set (of image samples).

Module 13 then trains the needed classifier (or detector) based on the training image set and input limitations. This may also require evaluating and tuning the training classifier using the evaluation set and input limitations. Preferred methods of training classifiers (and preferably automating the training of classifiers) are presented below. Module M15 then determined if any additional classifiers need to be trained. If so, then processing returns to module M13 to train the next classifier. Otherwise, processing proceeds to module 17.

Module 17 defines a vision solution candidate from a combination of the selected descriptors. As is explained above, selection of the descriptors depends on the user-input limitations, and may include parameter values, classifiers, images, etc.

Module 19 then tunes the vision solution candidates. This may require modifying classifiers based on the limitation inputs. For example, a general classifier for detection of a target object may support multiple views of the target object, but if it can be determined from the limitation inputs that the vision task requires detection of only a limited number of those views (such only being interested in the target objects left-side view), then the classifier may be adjusted to limit its detection to only the needed views. This would improve performance and reduce computational resource demands. As another example, some descriptors may support multiple parameter settings, these settings may be adjusted for the particular vision task. Some of the tuning tasks, such as modifying an existing classifier, may require use of the training library and evaluation library, but in some cases tuning adjustments may be made without use of any training library.

Module 21 then evaluates the tuned selected solution candidate by testing its performance using at least part of the working image library. If an evaluation library has been defined, then preferably the tuned selected solution candidate is tested using the evaluation library. Alternatively, if no evaluation library has been defined, then the tuned selected solution candidate may be evaluated using the entire working image library.

Module 23 then determines if the evaluation results of module 21 meet the user input limitations. More specifically, it may check if the evaluation results meet the specified performance limitations. If not, (M23=NO), module M25 increments the current tuning cycle count by 1, and determines if the maximum cycle count has been met. If the maximum cycle count has not been met, then processing turns module M5 where a different descriptor set may be selected and evaluated, and/or additional classifier(s) may be trained, and/or additional sample images should be generated. It is to be understood that if the working library has previously been divided into a training set and an evaluation, and if the working library is unchanged from the previous cycle (i.e., no new sample images were generated), then module M11 need not redefine the existing training set and evaluation set.

If module M23 determines that the results of module M21 met the performance limitations, or if module M25 determines that the maximum cycle count has been met, then module M27 may reports the results (such as into a log file) and the processing ends. Alternatively if module M25 determines that the maximum cycle count has been met, but the performance limitations have not been met, then the user may be required to adjust his input limitations, such as be adding additional limitations, and/or altering existing limitations, and/or providing additional seed images or image library (ies), and the system may begin processing anew.

A discussion of preferred systems/methods for training classifiers is as follows, beginning with FIG. 3.

Object detection is a technology that may determine the location, size, pose, and other characteristics of a target object in digital images. The object detection task can be considered as a two-class classification problem (object or non-object), or a probability classification problem. Learning-based approaches attempt to build a classifier using examples of object images and non-object images (positive and negative training samples correspondingly).

Usually the non-object class is not clearly defined, which makes the selection of negative training samples challenging. Poor selection of negative training samples may result in a large number of false detections. One way to solve this problem is to search for negative samples in a very large and diverse image set. That, however, makes training time prohibitive for many applications. Even if training time is not an issue, the use of a large image set may not guarantee low false detection rate.

An aspect of the present invention is a novel training technique that complements the overall training process with a feedback loop. The feedback loop training method may take as input two distinct feature pools.

The first pool includes a number of predefined baskets (types) of features. An individual feature basket includes a number of features that aim to characterize specific attributes of an object (e.g. color, shape, orientation etc), discriminate between various object of interest and classify them accordingly. Examples of shape attributes are circles, lines, arcs, ellipses, portions thereof or pieces of irregular contours. The feedback loop is employed at the basket level and at the level of constituent features as well.

The second pool consists of a single large pool of features that will be input to the feedback loop. The following is a description of the feedback loop aspect of the present invention followed by an illustration of the applicability of this method 300 (FIG. 3) to the basket of features pool type.

Figure 3:
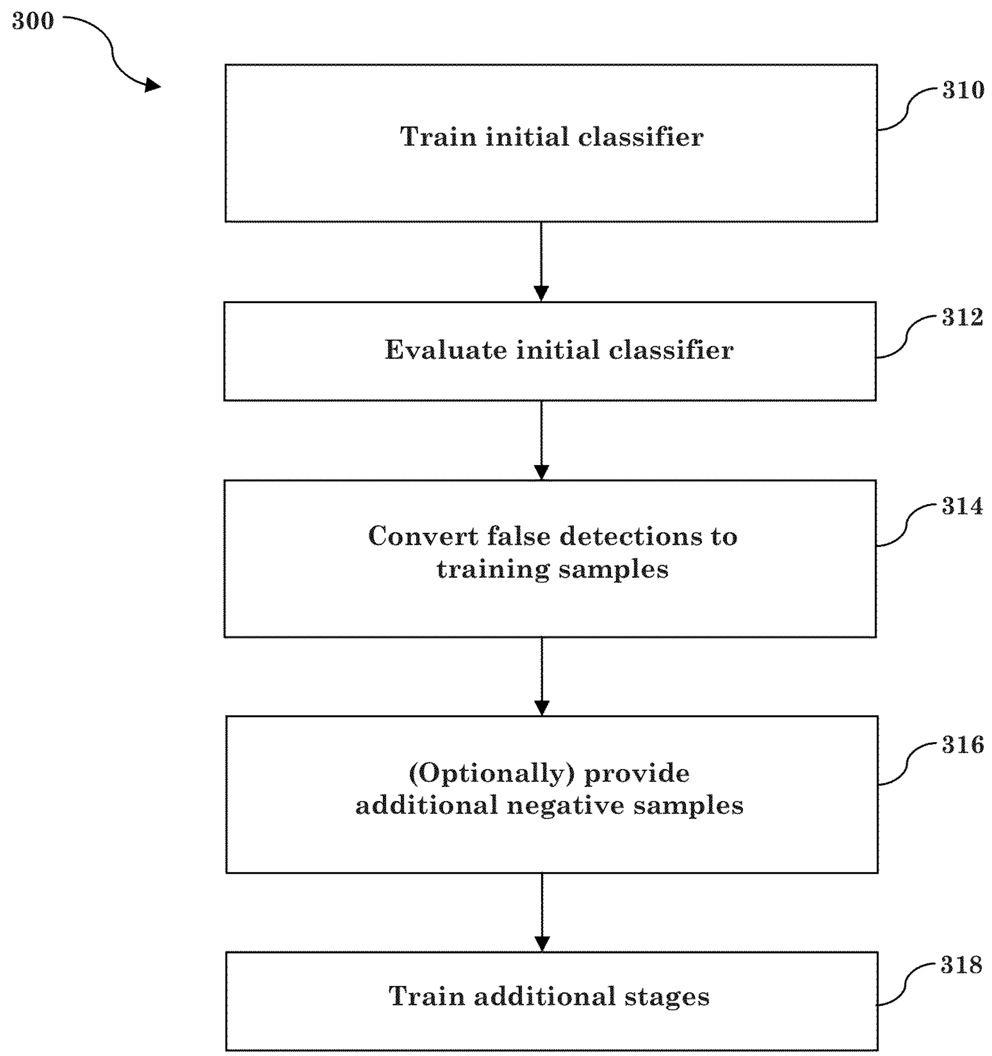
FIG. 3 is a flowchart of the feedback loop aspect of the present invention.

Referring generally to FIG. 3, in a first step 310, an initial classifier stage is trained. If a supply of negative training samples is limited, the training may stop because all negative samples have been used.

Then, the initial classifier is applied to an evaluation image set (step 312) with labelled ground truths, or to an image set that does not contain the object of interest. The latter image set may be generated from the same images that were used to create positive training samples, by removing the object of interest.

As a result of the classification using the initial classifier, a number of false detections will be obtained. After confirming the validity of these false detections, the false detections are used as negative training samples (step 314) to train one or more additional stages of the classifier (step 318).

As an option, the feedback may be manually assisted by providing additional non-object images similar to false detections exhibited by the initial classifier (step 316). That is, if the classifier persistently misidentifies a specific item as the target object being sought, then additional examples of this specific item under various conditions may be used as negative samples to train the classifier to better distinguish between this specific item and the target object. For example, a classifier trained for eye detection may falsely identify mouths for eyes. This problem may be solved by providing additional mouth images as negative training samples.

The classifiers with additional stages trained using the feedback loop have been shown to have a lower false detection rate.

To verify the effect of the feedback loop, an evaluation image set consisting of 700 images was split into two subsets with 350 images each. Subset 1 was used to obtain the feedback, while subset 2 was used for verification.

First, a classifier was trained and evaluated using subset 2. Then the classifier was applied to subset 1 to obtain additional training samples. Finally, the classifier trained using the feedback was evaluated using subset 2.

The table below shows the detection rate (DR) and false alarm rate (FA) for the original classifier and the classifier trained with the feedback.

| Classifier | DR, % | FA, % |
|---|---|---|
| Original classifier (without feedback) | 86.9 | 80.3 |
| Classifier with feedback | 78.5 | 15.4 |

Detection rate is calculated as the ratio of detected object to the total number of objects in the evaluation set. False alarm rate is calculated as the ratio of the number of false detections to the number of images in the evaluation set.

Another aspect of the present invention is the use of evaluation feedback for feature type selection In addition to the different color filters described above in the color feature selection and training solution, the feedback method uses a number of feature baskets. Each feature basket contains a number of geometrical features each invariant to scale, rotation, and translation. In practice, not any feature from any feature basket is an appropriate descriptor for any object. For example, features that depend on odd powers of the x and y coordinates of the object pixels may always produce zero for symmetric objects. Such features are therefore not good descriptors for these objects. The feedback method collects the values of all the features in all feature baskets while it is trained on different views of the objects of interest. It then analyzes the range of variation and the accepted values for each feature and will determine the applicable features. After training, the feedback method goes through a period of probation. During probation, analysis similar to what is done during training is carried out. At this stage, the behavior of each feature is analyzed again and features that do not produce acceptable discrimination are pruned.

Automated Dataset Acquisition

As discussed above, step 212 in method 200 is creation of a training set and an evaluation set. Object detection typically requires large datasets to adequately train the classifier network. In these datasets it is often necessary to have both positive and negative sample images and to be able to clearly distinguish between the two. It is also necessary for samples that include the object to have been labelled with ground truth attributions (e.g. location, orientation, pose, etc). These visual ground truth annotations to the dataset are usually input manually by an operator that is observing the object when its image is taken by a camera.

In general, the larger the dataset, the better the solution may be trained, which in turn leads to better detection results. However, large datasets require a long time to gather and are often not feasible to get manually as it could take days or weeks of labor to acquire and label the required number of images.

Below are described two methods/embodiments of automated dataset acquisition, i.e., of automating the generation of training/evaluation datasets, or sample images. Both methods make use of imaging processing techniques to generate (i.e., render) multiple new views of one or a few initial images (i.e., seed images) under various rendering configurations (such as lighting, texture, surface reflectance, etc.). Either or both embodiments may be used singularly or in combination to generate image samples for training and/or evaluation purposes.

In a first embodiment, a seed image is provided by a computer-aided-design (CAD) model (i.e., a CAD file) of a target object to be identified. This approach is useful in environments where CAD files of target objects are readily available, such as in manufacturing environments where CAD files of assembly parts may be accessible.

In a second embodiment, where CAD files might not be readily accessible, seed images may be provided by actually imaging a physical example of the target object, by taking one or more preferably two-dimensional (or alternatively 3D) photographic images of the target item. An outline of the target image in a scene is manually defined and ground truth labels are manually added/identified. Various imaging processing techniques, which may be similar to those used in the first embodiment, are then used to render new images of the target object by applying various specified rendering configurations, such as different rotations, view angles, lighting effects, colors, textures, backgrounds, degrees of image obstruction, etc.

In the first embodiment, computer renderings of CAD models are used to fully automate the dataset acquisition and labeling process with minimal human intervention. These computer renderings simulate the object realistically enough for the purposes of the object detection solution training. Additionally, since the images are generated from a predefined model (i.e., the CAD file), ground truth labels may also be assigned automatically to these computer generated samples. Fully automating the dataset acquisition in this way has the benefit that even large datasets can be generated on demand in relatively little time with very little effort.

To generate images, it is necessary to specify ranges for the configurable parameters such as object position, rotation, colors, lighting environment, surface properties, camera position and orientation, and various effects like noise and blur.

Each range contains information such as the desired minimum values, maximum values, frequency, distribution and sampling method. The resulting dataset is the combination of all ranges for all parameters. For example, parameters that may be configured in an embodiment of the present invention include, but are not limited to:

lighting environments different backgrounds material reflective properties surface texture properties object position and orientation camera position and orientation camera properties (e.g. field of view, noise, blur, resolution, etc)

setting various render modes (with and without shadows, wire-frame, grayscale, etc.)

Each sample in the dataset is preferably rendered with a rendering engine that renders the scene. Ground truth data is automatically generated to accompany the rendered images. Ground truth data may include, but is not limited to, any of the following:

description of the configuration that generated the image bounding boxes of all objects in the scene depth and/or location information information on all transformations applied to render the scene orientation and pose information of the target object within the scene lighting source type, direction, intensity, etc.

Figure 8:
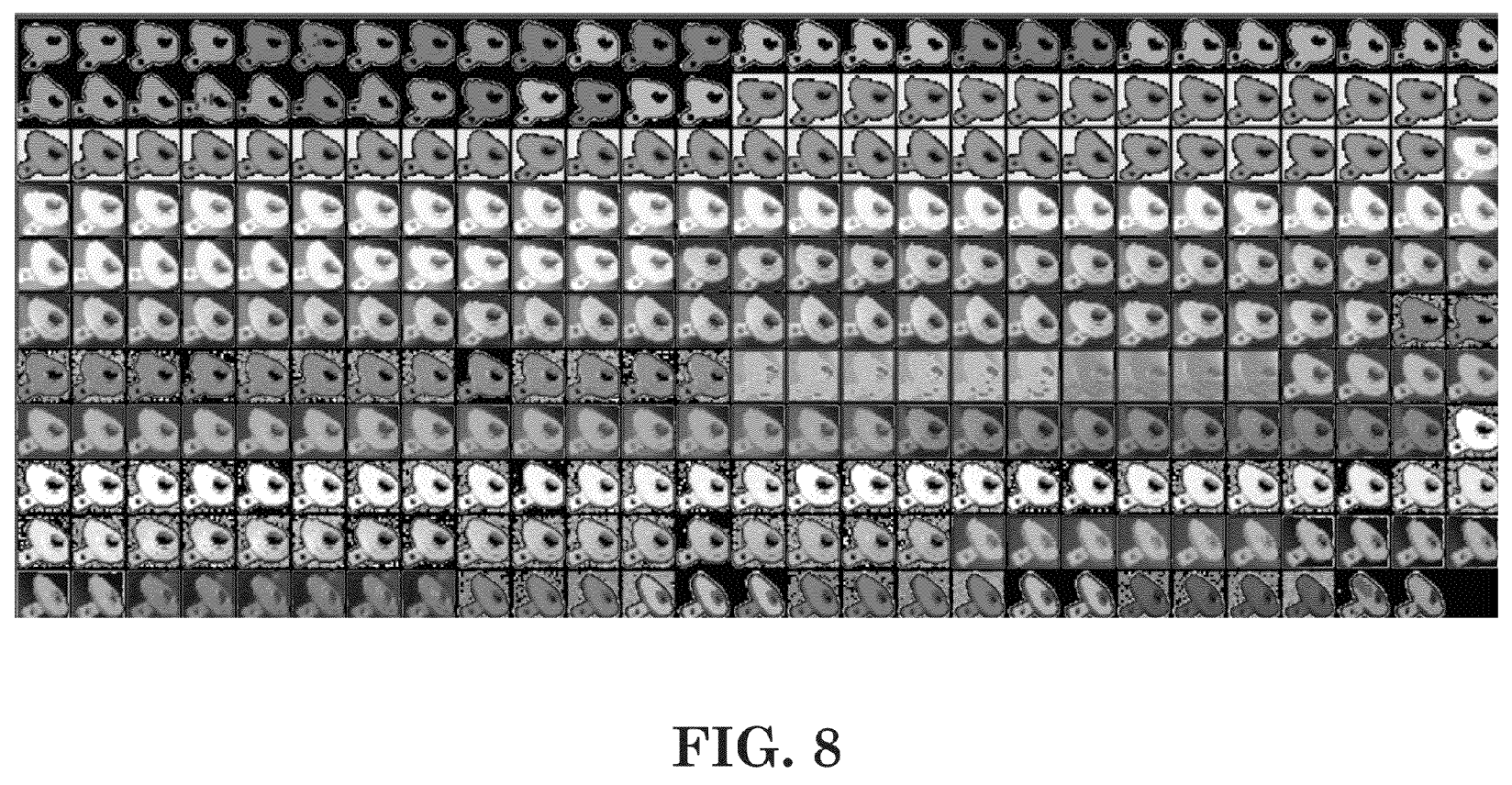

In a preferred embodiment, the standard graphics specification Open Graphics Library (Open GL) is used to render the samples using shader programs in order to maximize speed of dataset generation while maintaining good visual quality. FIG. 8 illustrates some sample images rendered using an image rendering method in accord with the present invention. Other embodiments may use other rendering techniques such as ray-tracing.

Figure 4:
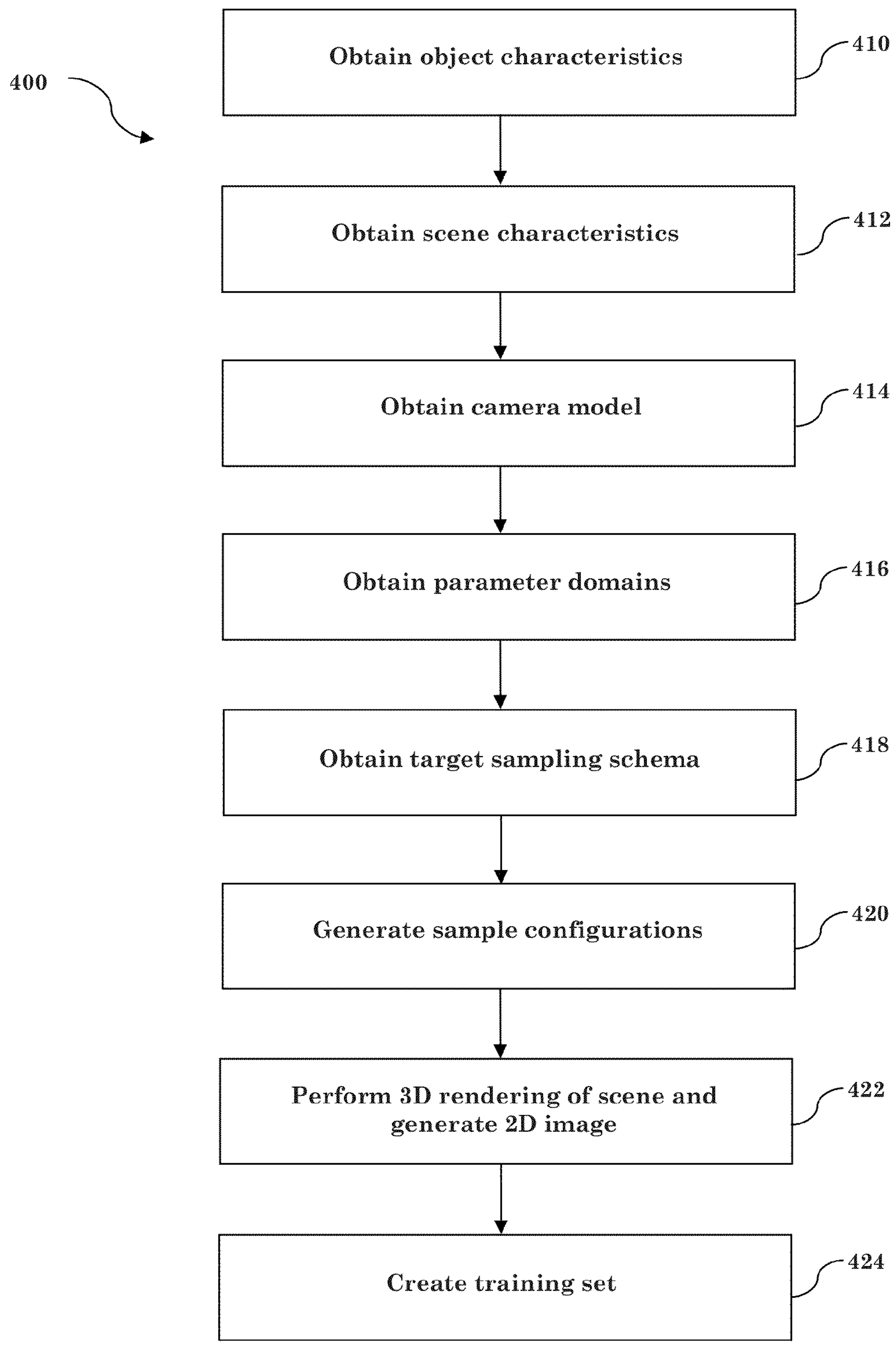
FIG. 4 is a flowchart of the automatic dataset acquisition of the present invention.

FIG. 4 illustrates the general steps of the automatic dataset acquisition method 400 of the present invention. In each of the steps, the term "obtain" will be used generally to describe how information/data is input or acquired. In a preferred embodiment, a user may input information or data through keyboard 166 (FIG. 1) that is transferred to object processing device 100 through computer 150 and interface 102, for example. Alternately, information and data may be previous stored in memory such as ROM 108 or RAM 104 and acquired by processor 106 in method 400.

In step 410 the object characteristics are obtained. An object can be described by its characteristics and parameters related to its characteristic. For example, an object characteristic could be color and parameters related to such color could be expressed as values in a color space, such as RGB. In the present invention, characteristics include, but are not limited to: an object model (e.g. CAD model); a reflectance model based on object material (reflectance model may include color as well as diffused and specular reflection—a simple example would be the object is mostly blue and shiny); surface texture and uniformity characteristics.

In step 412 the scene characteristics and parameters corresponding to each characteristic are obtained. In the present invention, scene characteristics may include, but are not limited to: images of possible backgrounds; the viewing directions, positions and orientations of the object, camera and light sources in the scene; and the model of the lighting environment.

In step 414, the camera model is obtained, including but not limited to a modeled camera's intrinsic and extrinsic calibration parameters.

In step 416 the parameter domains are obtained for the object, scene, and camera characteristic obtained in steps 410, 412, and 414, respectively. A numeric-based domain assigned to a parameter is specified by a range of values between a minimum value and maximum value. For example a parameter domain for object size may be specified by a range of minimum width to maximum width in centimeters or inches. A non-numeric-based domain assigned to a parameter is specified by a list of values, e.g. a list of possible backgrounds for a scene characteristic.

In step 418, a target sampling schema is obtained by selecting a sampling type and distribution type. In the present invention, sampling types may include but are not limited to: linear across the min/max range; or random from the min/max range. Distribution types may include but are not limited to: linear (all samples in the range weighted equally); or Gaussian (concentrate samples more in the middle of the range).

In step 420, the present invention generates sample configurations according to the sampling schema obtained in step 418 and using the parameter domains obtained in step 416.

In step 422, the present invention performs 3D rendering of the scene using computer graphics and generates a sample 2D and/or 3D image based on the rendering. In a preferred embodiment, the computer graphics method used for rendering is Open GL, but an alternate method is ray tracing.

In step 424, the present invention creates a data set, such as for pattern recognition algorithm training and evaluating (i.e., a training/evaluating set), for each sample configuration. The training set is comprised of the following for each sample configuration generated in step 420:

a) the image generated in step 422;

b) parameters of the sample configuration—in the present invention these parameters include, but are not limited to one or more of the following: location of different objects in the scene, their orientations, locations of light sources, camera distance, etc.; and c) data relating to the target object(s) in the 2D image generated in step 422—in the present invention, this data includes, but is not limited to one or more of the following: bounding area outlining the object in the generated image, object 2D mask, area of the object occluded by other objects, object 3D mask, etc.

Figure 9:
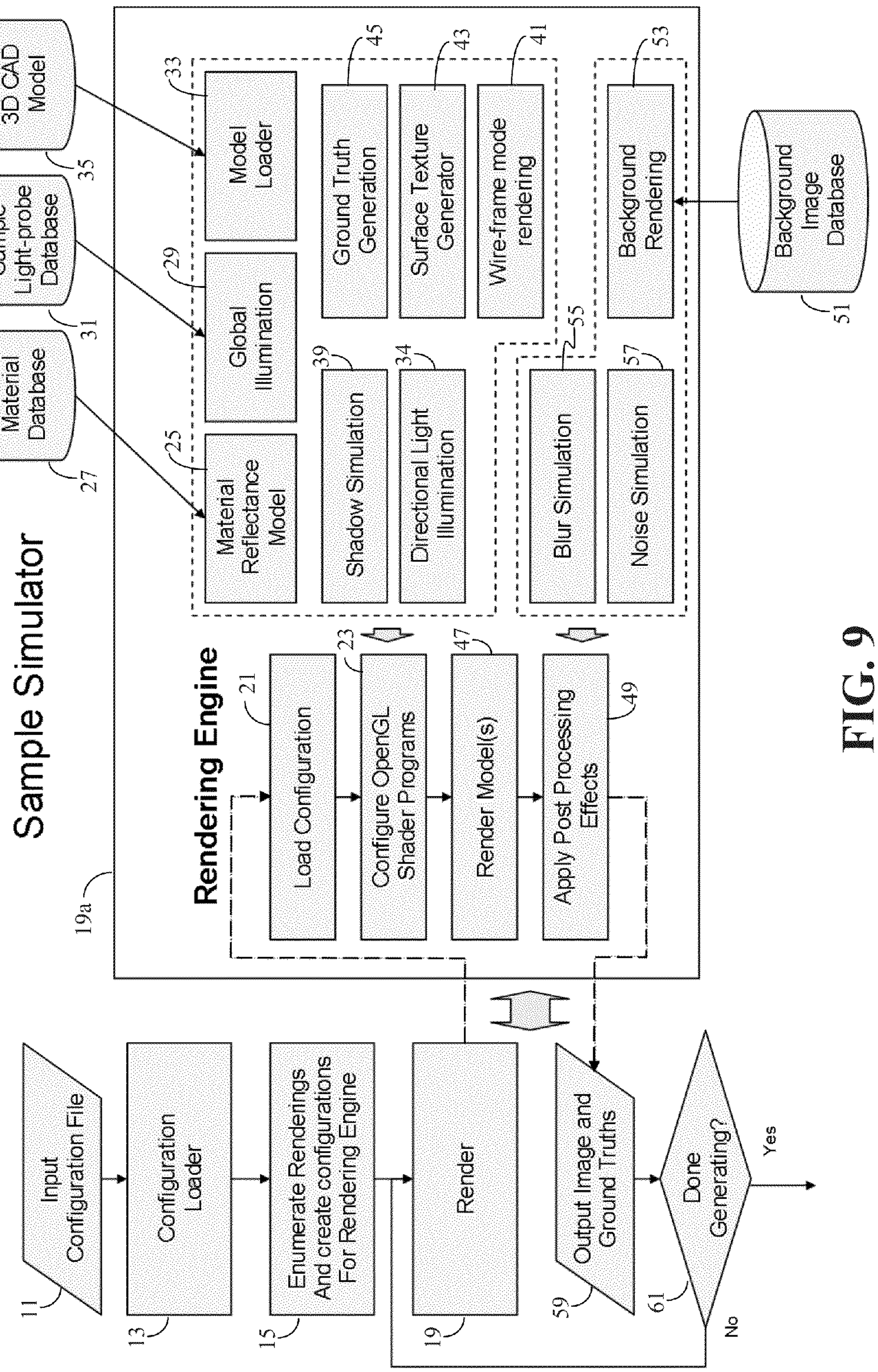
FIG. 9 illustrates a structural flow chart of an embodiment of the present invention.

A structural example of the present embodiment is provided in FIG. 9. As is explained before, a user may submit various configuration requirements, and these requirements may be combined into a configuration file. Thus, a configuration loader 13 may receive as input the configuration file, and process block 15 then enumerates renderings (i.e., identifies/describes the sample images that are to be rendered/generated) and creates configurations based on the configuration file or a rendering engine, which then renders new images.

In the present example, this rendering engine is identified as render block 19, internal view of which is provided as block 19*a*. Rendering engine 19*a* begins by loading the configuration for a new image, as illustrated by block 21. Block 23 then configures OpenGL shader programs. This may make use of multiple resources. For example, the configuration requirements may specify that a surface of the target sample is of a specific material, in which case a material reflectance model 25 may access a material database 27 to determine an appropriate reflectivity for the rendered image. Alternatively, a specific reflectivity may have been directly provided in the configuration file. Global illumination block 29 may provide lighting effects for the rendered image by accessing a library of lighting samples provided by sample light-probe data base 31. Model loader 33 then accesses the seed image upon which the generated image is to be based. In the present example, the seed image is a CAD model provided by 3D CAD Model database 35. A wire frame of the rendered target object is provided by wire-frame mode rendering block 41, and surface texture generator 43 provides an appropriate surface for the rendered target object. Ground truth labels are provided by ground truth generation block 45. Directional light illumination block 37 and shadow simulator 39 then add the appropriate lighting effects to the rendered target object model.

The rendered models may be collected by render model(s) block 47. Although the target object is now rendered, before it can be used as a training/evaluating sample, it is preferred that the characteristics of a camera similar to that used in the evaluating process, or in the actual implementation of the present invention, as well as probable background views be taken into consideration. In the present example, this is provided by block 49 to apply post processing effects. Background rendering block 53 may access a background data base 51 to the rendered appropriate backgrounds for the rendered image. The camera characteristic may be incorporated using a blur simulation block 55 and noise simulation block 57.

With the labelled sample image thus rendered with appropriate background, lighting and camera effects, the block 59 then may output the rendered image and ground truths. If block 61 determines that all the desired image variations have been rendered (output=Yes), then image rendering me end, but if additional configurations are yet to be rendered (output=No), then processing returns to image render block 19 and another new image is rendered according to the configurations specified by block 15.

In an experimental run of the present invention, simulated samples (i.e., rendered sample images) in a training set created by means of method 400 were used to train a statistically based object detection algorithm. Running the object detection algorithm on ID1036 evaluation images resulted in a 98.64% Detection Rate with 0% false positives.

In the second embodiment of automated dataset acquisition, one or a few seed images are obtained by manually photographing and labeling the target object. Conventional two-dimensional (2D) photography and/or perspective three dimensional (3D) photography (that may provide depth information) may be used to obtain these seed images. Optionally, the target object may be photographed in the environment where detection is desired (for example, at a given manufacturing stage in a multi-stage manufacturing process). The objective of this second embodiment (like that of the first embodiment described above) is to reduce the time of preparing training data for training object detection classifiers using a statistical learning approach from a set of training images. In one embodiment, a cascade of statistical classifiers is used to build the classifiers for object detection. In order to detect objects with any degree of in-plane rotations, the detection pipeline requires the trained cascade to handle objects with in-plane rotation between −15° and 15°. The detection pipeline first attempts to detect objects with −15° and 15° in-plane rotation. In case of failure, it attempts to rotate the feature windows 90°, 180° and 270° degree to detect objects with 75°~105°, 165°~195° and 255°~285° in-plane rotations. If this attempt fails again, the detection pipeline will attempt to rotate the input image 30° and −30° and then rotate the feature windows 90°, 180° and 270° on the rotated images to handle objects with any other angle of in-plane rotations.

In order to construct a cascade of classifiers to handle objects with in-plane rotation of −15° and 15°, the training data set should contain samples with rotations of different angles in the range of −15° and 15°. If an application attempts to detect objects under different background or lighting environment, the training data set should contain samples under different background or lighting environment. If an application attempts to detect blur objects, the training data set should contain blur samples.

The conventional method of data collection is to try to collect object images of many samples with different rotation angles (in the range of −15° and) 15° in as many environments as possible. For example, to generate an application that detects objects under black and red backgrounds, tolerating some lighting variation, and some blur, the data collection involves first placing the object on a turnplate on a black background, rotating the object between −15° and 15°, taking a picture of the object every 1 degree to obtain object images. The result will be 31 images taken on black background. Next, the object is placed on a red background and the procedure is repeated to get 31 images on red background. Then, the object is moved to another location with a different lighting environment, or a special lighting device is used to vary the lighting in the same location, and the above process is repeated to acquire more object images. Even for a very simple object detection application, more than 1000 samples are required to train the classifiers. Collecting and labeling 1000 images will take a person about 3 or 4 days (or about 30 hours).

In the present invention, some processes performed during the traditional data collection process are executed using image processing algorithms. For example, the 31 rotated images with −15° and 15° degree in-plane rotation under the same condition are simulated by an image rotation algorithm on a single image in the present invention. Blur images are also simulated by an image processing algorithm. Pixel intensity is varied within a range by applying algorithms to simulate the lighting variation. In this manner, only a few real images (seed images) are needed and the labeling is only performed on the seed images. The algorithms work on one or a few seed images with labels and generate a number of processed images. Another way of generating training samples is to build a model of camera images to simulate images. However, building a realistic model of camera images is extremely difficult. The advantage of the present invention is that it uses seed images that are representative of real camera images with their inherent noise and artifacts.

Rotated Images Generation

Figure 5:
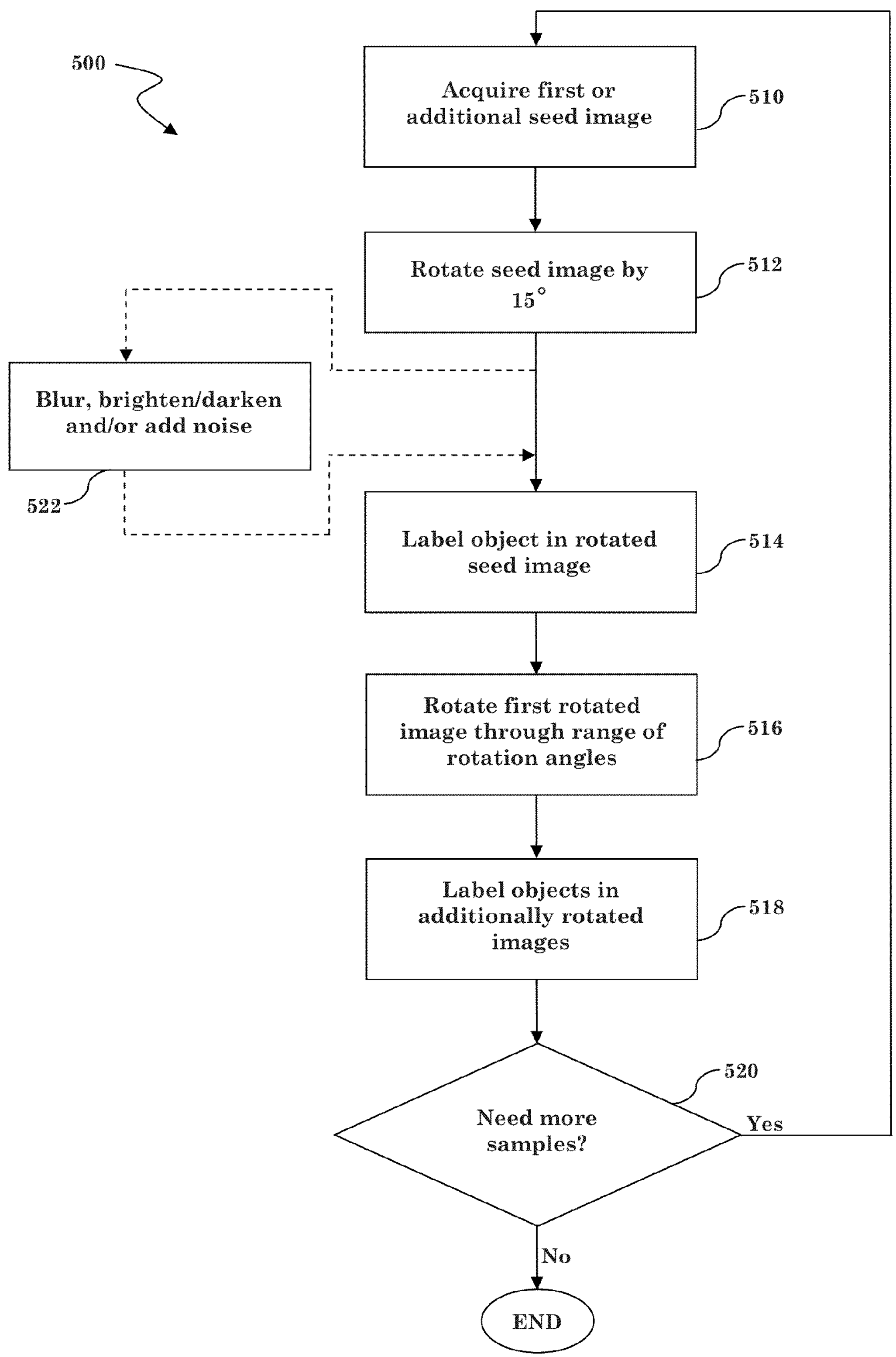
FIG. 5 is a flowchart of the automated dataset generation from one or a few seed images aspect of the present invention.

FIG. 5 illustrates the basic steps in method 500 of the present invention. In the present invention, an object is placed on an ideal background under ideal lighting conditions. The ideal background and lighting are the actual background and lighting of the environment in which the object will be identified by the computer vision system, i.e., a robotic assembly line in the factory. If the actual location is not available, then the background and lighting are selected to closely resemble the actual location. The object is aligned to a 0° position, i.e., directly facing the camera. Then one picture of the object is taken to create the (target) object image. The 0° in-plane rotation is defined by the user. It can simply be the position in which this first picture is taken. Taking a picture is one way of acquiring the single object image (step 510). This single object image may have also been previous stored memory, e.g. ROM 108, RAM 104, or hard disk 160 (FIG. 1). Alternately, this single object image may have been generated using method 400, previously discussed.

The single object image is rotated by −15° degrees in object processing device 100 (step 512) using affine transformations based on the following formulas:

$$W' = W * |\cos(\theta)| + H * |\sin(\theta)| \quad (1)$$
$$H' = H * |\cos(\theta)| + W * |\sin(\theta)|$$

$$R = \begin{bmatrix} \cos(\theta) & -\sin(\theta) & (W' - W) * 0.5 \\ \sin(\theta) & \cos(\theta) & (H' - H) * 0.5 \\ 0 & 0 & 1 \end{bmatrix} \quad (2)$$

$$P(x', y') = R * P(x, y) \quad (3)$$

where W and H are the width and height of the original image, θ is the rotation angle, W' and H' are the width and height of the rotated image, P(x', y') is the pixel value in position (x', y') in the rotated image while P(x,y) is the pixel value in position (x, y) in the original image, and R is the rotation matrix. This creates a first rotated image.

The object in the first rotated image is labelled by defining its bounding box (step 514). Object bounding box labeling can be conventionally performed manually or under program control. In order to generate the 31 object images that are generated conventionally with 31 pictures, the first rotated image is then rotated through a range of rotation angles (step 516) using affine transformations to create additionally rotated object images. Rotating the first rotated image through a range of rotation angles 0°~30° is equivalent to rotating the original seed image through a range of rotation angles −15°~15°. A benefit of rotating the first rotated image is that the maximum size of the bounding box of the object is known from the first rotated image and the object size in an additionally rotated image with any angle in the range of (0°~30°) can be approximated using the object size in first rotated image, which simplifies the calculation of object size. For example, when calculating the position and size of the object with rotation angle ϕ, the method of the present invention calculates the new object center ($c_x'$,$c_y'$) using the above formulas based on the object label of first rotated image since the object center ($c_x$, $c_y$) in the first rotated image is already known, and the new object size will still use the object size in first rotated image. When the object center and size are known, the object with rotation angle ϕ can be cropped out and labelled in the additionally rotated image (step 518) to become a training sample. The 31 training images are generated based on the first rotated image. Of course the 31 training images can also be used as the evaluation set of object images. In order to generate a large training set, a number of seed images are acquired and processed as discussed above, with each seed image yielding 31 training images. So, if more samples are needed in a particular application (step 520 returns Yes), then the process loops to step 510 to acquire an additional seed image. Once a sufficient number of samples are generated for the training and/or evaluation set (step 520 returns No), the process ends.

In certain object detection/computer vision applications objects must be detected in a variety of non-optimal or varying environmental or operational conditions. Thus, the present invention provides options (step 522) for blurring, brightening/darkening and/or adding noise to the seed image before proceeding to step 514.

Blur Image Generation

In certain object detection/computer vision applications, a blurred object must be detected. In step 522, the present invention allows the seed image(s) to be blurred to create a set of blurred training samples from one or a few seed images.

Gaussian blur is used to simulate the imaging device blur in a preferred embodiment. The kernel for Gaussian blur is shown in the following formula:

$$G(x,y,\delta) = \exp((x^2+y^2)*(-2.0*\delta^2)) \quad (4)$$

By convoluting the first rotated image with the above kernel, a blurred image is generated. The degree of blur is controlled by the window size and δ.

Lighting Image Generation

Variations in the lighting environment will cause pixel intensity variation in the image. In the present invention, the lighting variation is simulated by brightening or darkening the pixel intensity of the first rotated image.

Noisy Image Generation

In the present invention a noisy image is simulated by applying different types of noise such as white noise or salt and pepper noise to the first rotated image.

Using method 500, including step 522, 124 (31×4) images are generated from a single seed image and the manually labeling is performed only on this one image. As an example of an application of the present invention, in order to develop a simple object detection application, 10 real seed images were collected, each having a different background and different lighting and each was labelled. More than 1000 training/evaluation images were generated using method 500 with the data preparation time of only half an hour.

Seed Image Collection

Preferably a user will try to make seed images represent and cover the environmental variance of the real-world application. For example, seed images should be collected in different locations, with different backgrounds and lighting, and even at different times of the day because the ambient lighting may change.

As mentioned above, seed images need not be "real" images, i.e., taken with a camera. They can be simulated images using computer graphics software, e.g. using method 400 of the present invention.

Case Study

For one object (hinge) detection application, two classifiers were trained. One classifier was trained using real, manually collected and labelled samples and the other classifier was trained using a training set generated from 10 real images using the method 500. Table 1 compares the detection rate (DR) and false alarm rate (FA) on 4 test sets of the two classifiers. The experiment results show that the two classifiers were comparably effective.

|  | Test Set 1 (100 images) | | Test Set 2 (200 images) | | Test Set 3 (50 images) | | Test Set 4 (50 images) | |
|---|---|---|---|---|---|---|---|---|
|  | DR | FA | DR | FA | DR | FA | DR | FA |
| Real samples | 92.17% | 0% | 100.00% | 1.6% | 78.00% | 4.0% | 58.00% | 2.0% |
| Samples are generated from 10 seed images using the method presented in this invention | 92.17% | 0% | 100.00% | 0% | 74.00% | 0% | 44.00% | 0% |

As is explained above, the present invention has many features. Firstly, the defining of an object recognition (i.e., computer vision) solution (or detector) is simplified by have an individual (i.e., system user) provide general selections of a target object's most distinctive visual characteristics. Multiple classification nodes are accessed or defined (for example from a library) based on the user input to define an overall detector for the target object, within the specified parameters. Secondly, given an appearance configuration list, a plurality of training/evaluation images may be generated (i.e., rendered) automatically from one or a few seed images, and the multiple nodes are trained and evaluated using the rendered image samples. There are multiple methods of defining and training the multiple nodes, a preferred method is described herein below. For the sake of completeness, an overview of classification nodes and some alternate methods are also provided.

Multiple Node Background

Figure 10:
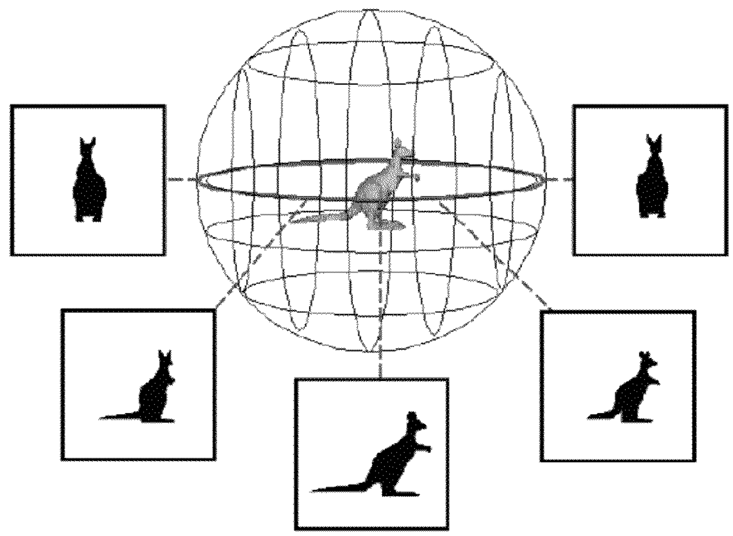
FIG. 10 illustrates differences in the appearance of an object when viewed from different directions.

The Multiple node concept is to find a compact (i.e., a small number of nodes) to detect/identify an object from given ranges or whole view spheres. This can be complicated by the fact that for a given object, its appearance will be different from different view directions. That is, given six degrees of freedom (6 DoF) for pose positions relative to a camera position, the target object will have different shape, outline, size, reflectance, etc. from each of those poses. An illustration of this is provided in FIG. 10. Thus, an object may be quite different in shape and appearance at different view angles, as defined, for example, as:

1. In-plane-rotation or orientation (SK)
2. View angles (EL, AZ)
3. Translation (x, y)
4. scale (distance or z)

In addition, the lighting conditions, environments (clutter in background), shading, material reflection and occlusion will affect the object appearances. As a result, it is more difficult to detect an object within a large range of views, than in a predefined fixed view.

In order to detect an object, the presently preferred method uses scanning windows to handle translation (x,y), and scaling factor (to handle distance z), and multiple orientation of scanning operations (scanning in 12 direction with 30 degree intervals to handle in-plane-rotation SK). Due to the large variances in the object's appearance from one view angle to another, multiple nodes are required to handle the different view angles (for example, EL and AZ). Each node further needs to be trained to tolerate variance within a smaller range of view angles within each of the defined 6 DoF.

But there is no guarantee that training of a node will be successful; the node may, or may not, converge during training. Thus, a question that should be addressed is how to prune (or eliminate) nodes that do not contribute substantially to a solution, how to harvest (i.e., select) nodes that would likely contribute more substantially to a solution, and/or how to combine whole or partial node to optimize the system's performance. The combining of multiple nodes is important in the construction of a multiple node (i.e., multi-node) structure/solution. In determining of which nodes to harvest for the construction of a detector, a question to keep in mind is which nodes converge during their training. If the node does not converge, then it will likely not contribute substantively to identifying a target object, and thus probably not be a good candidate for harvesting.

Multi-node research is challenging because the following relationships are unclear:

Variance tolerance vs. convergence on the object, configuration, and environment Prediction or link between clustering result and performance of detectors Convergence condition vs. optimal number of views with constraints on the detector's performance Real evaluation set vs. simulated training set. Evaluation set may not be consistent with results obtained from the training set.

Key Areas of Interest are:

1. View Clustering:

Try to define a similarity function or clustering techniques that use the most suitable features similar to those used by the detector to tolerate shape/other variances. Features should be weak invariant to scale, rotation, view/pose, and translation.

Try to find merging/grouping criteria to measure shape variance and to predict/estimate discriminative power.

Try to find the relationship between merge criteria and performance of the detector (convergence, discriminative power).

2. Understanding Trainer and Detector

Positive, negative samples and optimal parameters for a given application

Evaluation protocol, tools to study convergence condition and performance

Multi-Node Schemes

There are many multiple node (i.e., multi-node) schemes, and three are discussed herein below.

Scheme 1: Multi-class problem: Clustering in feature space (e.g. k-mean)

According to initial investigation by Applicants, it was found that the data clusters from scheme 1 do not seem to be optimal for the present application due to the following reasons:

Difficulty in determining the number of nodes

Clustering is sensitive to feature or distance function

Difficulty in re-grouping of nodes (such as node splitting and/or merging)

Scheme 2: Similarity/Distance Function+Merging Criteria

This second scheme can be summarized as: iteratively find the most represented view→train a node and adjust until converge→remove all detected samples by the node. According initial investigation by Applicants, it was found that the clusters from scheme 2 do not seems to be optimal for the present application due to the following reasons:

Imbalanced view clusters: the first few harvested clusters contain many views, while later nodes may contain very few views or single views Number of nodes may not be small enough for the present purposes.

Difficulty in re-grouping nodes due to all nodes being impacted by changes in merging criteria Scheme 3: Bottom-Up Grouping or Clustering by Shape Variance and Top-Down Node Harvesting According to initial investigation by Applicants, it was found that the clusters from scheme 3 seem better suited to the present application than schemes 1 or 2. Scheme 3 is therefore described in more detail below.

Figure 11:
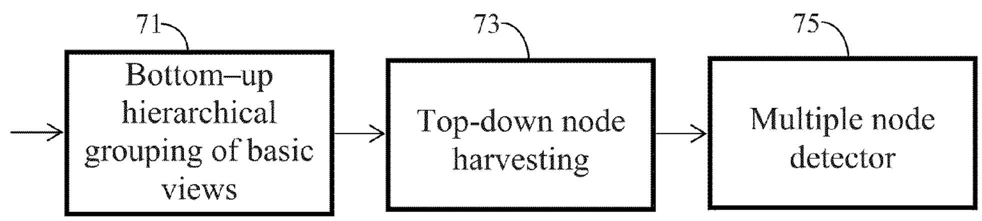
FIG. 11 shows the general process flow of bottom-up grouping or clustering by shape variance and top-down node harvesting for the creation of a multi-node detector.

Scheme 3 is summarized in FIG. 11. A first stage 71 implements is bottom-up hierarchical grouping (i.e., tree or dendrogram construction) of the basic views (or alternatively of all the rendered training samples). This hierarchical structure may be based on shape variance. This will likely produce a large tree (i.e., dendrogram) with many internal nodes and many leaf nodes. It's been found that a high degree of discrimination/classification can be maintained by appropriate selection a reduced number of these nodes. This is illustrated by top-down node harvesting stage 73, which may harvest nodes based on convergence conditions. The harvested nodes are then collected in stage 75 to define the multiple node detector (i.e., define the multi-node detector).

There are multiple methods of clustering data in stage 71. Known methods are, for example, data may be clustered in a feature space using k-means and/or hierarchical view grouping. Some important considerations in clustering are the similarity/distance function and merging/stopping criteria. When building clusters of view, one should carefully chose the similarity measure and grouping criteria, and take the following into consideration:

Feature selection to maintain consistency between real images and simulated (i.e., rendered) images Relationship between clustered views and shape variance Shape variance versus training convergence In investigating different clustering approaches, one should consider feature selection, clustering algorithm selection, validation results and interpretation. The following knowledge and validation 'criteria' were used to choose the feature and clustering algorithm for 'ideal' view partitions/clusters:

Compactness of view partitions/positive (5 to 10 nodes): a small number of features/weak classifiers is preferable because too many features will slow down the match stage.

Coverage down the match stages (5 to 10) with minimal nodes

Overlapping owners between nodes

Performance: close 100% detection rate (DR) and a low false positive rate (FPR), the fewer FP the better.

The visual validation between manual grouping and clusters from different clustering methods was investigated. As a result of this investigation, a Histogram of Gradient features (HOG) was selected and hierarchical grouping was selected as the clustering algorithm.

The HOG feature extraction consists of the following steps:

Gradient calculation: derivative in x and y directions

Angles of gradient are calculated. The orientations are divided into N (e.g. 9) bins Partition the image into blocks (e.g. 8×8 pixel block)

Figure 12:
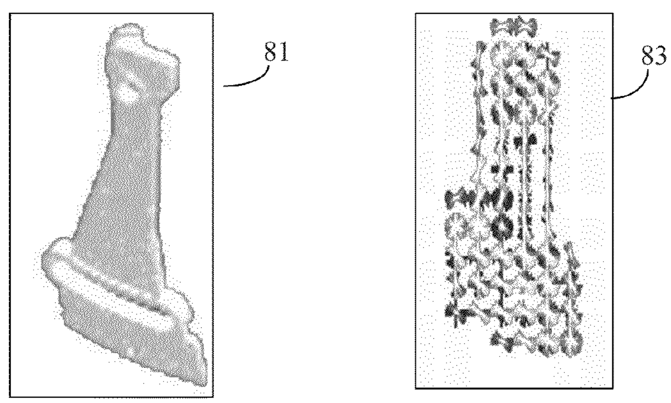
FIG. 12 illustrates an example of HOG feature extraction.

For each block, gradient magnitude weighted histogram on the orientation bins is computed Histogram normalization An example of HOG feature extraction is illustrated in FIG. 12. Image 81 is an input image, and image 83 illustrates the HOG features.

The HOG feature for an image can be treated as a shape descriptor. For example, for an image of 64 by 40, there are 8 by 5 blocks (e.g. 8×8 pixels per block) and each block will have a histogram of N (e.g. 9 bins). The HOG feature for the image will be of a 8×5×9 dimension vector. If more than one kind of normalization (e.g. 4) is used, the HOG feature for the image will have a higher dimension equal to 8×5×9×4.

Code to compute HOG features is as described in "Histograms of Oriented Gradients for Human Detection" by Dalal & Triggs, CVPR05, herein incorporated in its entirety by reference.

If the input image has dimensions [m×n], the size of the computed feature vector H is [m/sBin-2 n/sBin-2 oBin*4]. For each non-overlapping sBin×sBin region, one computes a histogram of gradients, with each gradient quantized by its angle and weighed by its magnitude.

The distance, D, function between 2 basic views is defined as the squared difference of HOG features: D(H1, H2)=(H1−H2).^2

Given a set of N items to be clustered, and an N×N distance (or similarity) matrix, a basic process of hierarchical clustering is as follows:

1. Start by assigning each item to its own cluster, so that if you have N items, you now have N clusters, each containing just one item. Let the distances (similarities) between the clusters be equal to the distances (similarities) between the items they contain.

2. Find the closest (most similar) pair of clusters and merge them into a single cluster, so that now you have one less cluster.

3. Compute distances (similarities) between the new cluster and each of the old clusters.

4. Repeat steps 2 and 3 (immediately above) until all items are clustered into a single cluster of size N.

Step 3 can be achieved in different ways, which is what distinguishes single-link from complete-link and average-link clustering. In single-link clustering (also called the connectedness or minimum method), one considers the distance between one cluster and another cluster to be equal to the shortest distance from any member of a given cluster to any member of another cluster. In complete-link clustering (also called the diameter or maximum method), one considers the distance between one cluster and another cluster to be equal to the longest distance from any member of a given cluster to any member of another cluster. In average-link clustering, one considers the distance between one cluster and another cluster to be equal to the average distance from any member of a given cluster to any member of another cluster.

Figure 13:
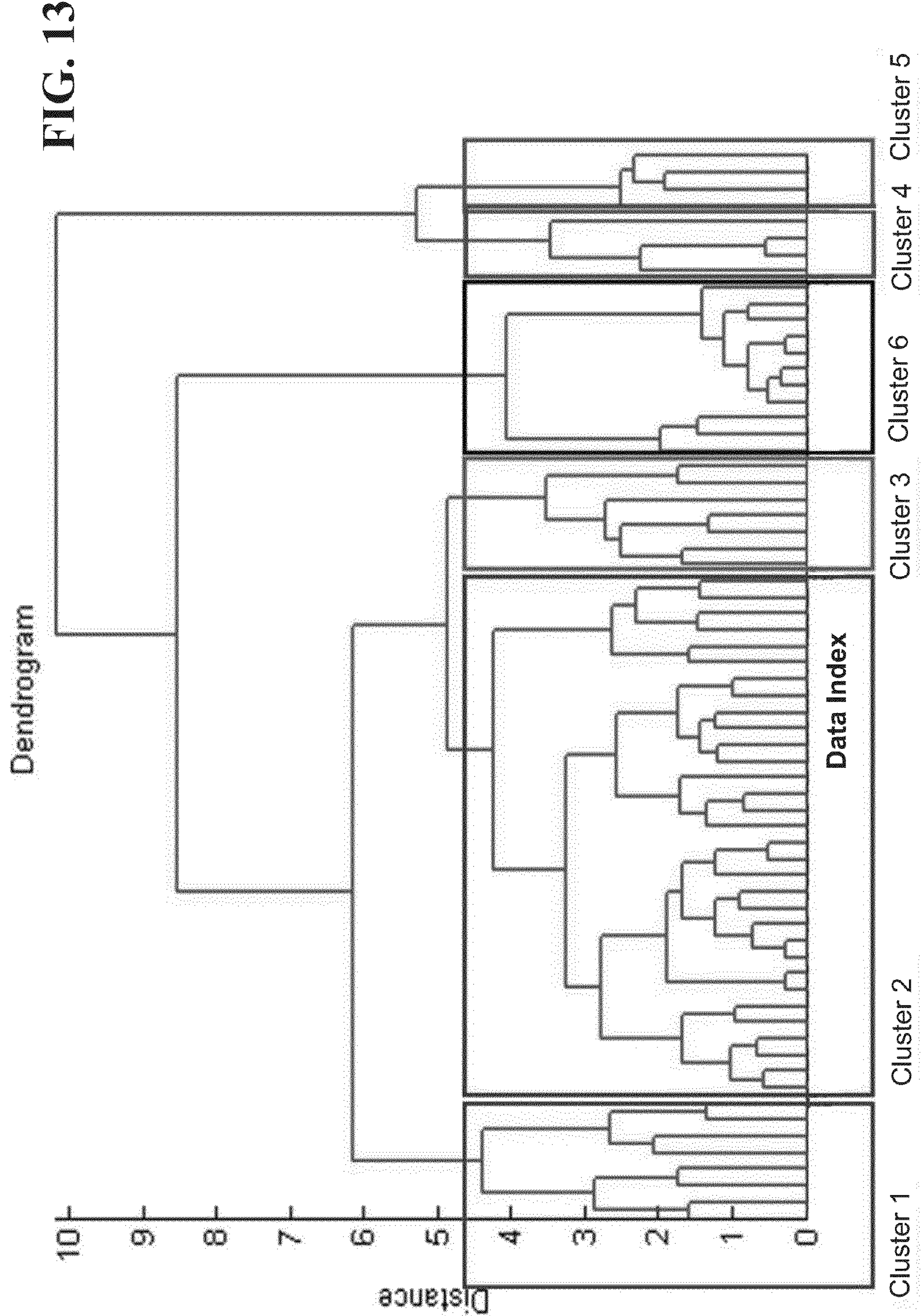
FIG. 13 illustrates a dendrogram and clustering results achieved by complete-link clustering on 66 basic views (i.e., rendered samples) of a test object.

The presently preferred embodiment implements complete-link clustering since it appears to achieve better clustering results for our purposes, which are close to manual clustering. For example, FIG. 13 illustrates a dendrogram and clustering results achieved by complete-link clustering on 66 basic views of a test target object. Once the hierarchical tree (or dendrogram) is built, the clusters can be analyzed at a distance. For example the 6 clusters of FIG. 13 are obtained at distance 4.5. The clustering from the root node to the sub-nodes can be explored until a single basic view is achieved.

Figure 14:
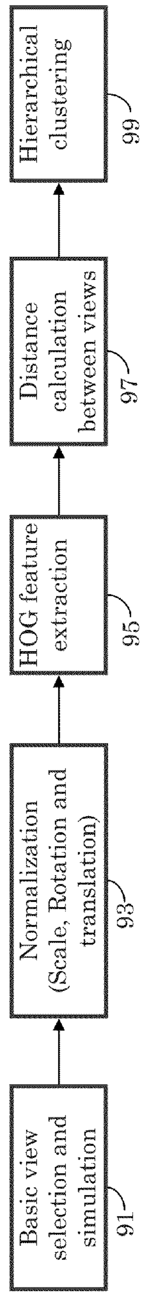
FIG. 14 shows some general steps in the hierarchically clustering of basic views into a tree using HOG feature.

With reference to FIG. 14, hierarchically clustering basic views into a tree using HOG feature can be divided into a few general steps. These steps include step 91 of selecting and simulating basic views (i.e., gathering real and/or rendered samples), step 93 of normalizing of the basic views (including scale, rotation and translation), step 95 of extracting HOG features, step 97 of distance calculation between views, and step 99 of hierarchical clustering. Once the tree of hierarchical clustering is thus obtained, top-down node harvesting follows.

Top-Down Node Harvesting

The top-down node harvesting attempts to answer two questions:

(1) What is the optimal number of nodes to cover the view ranges?

(2) What are the multiple nodes?

Factors that have an impact on the multiple nodes are:

target Objects—complexity of 3D objects and/or/versus 2D planar objects, and object size/distance between the camera and the target object Background/Negative samples—how similar are they to the target object(s)

Features—Are they discriminative features or weak features? How tolerant are the features to different environments, view angles and rotations?

Training—"convergence" at training phase

Figure 15:
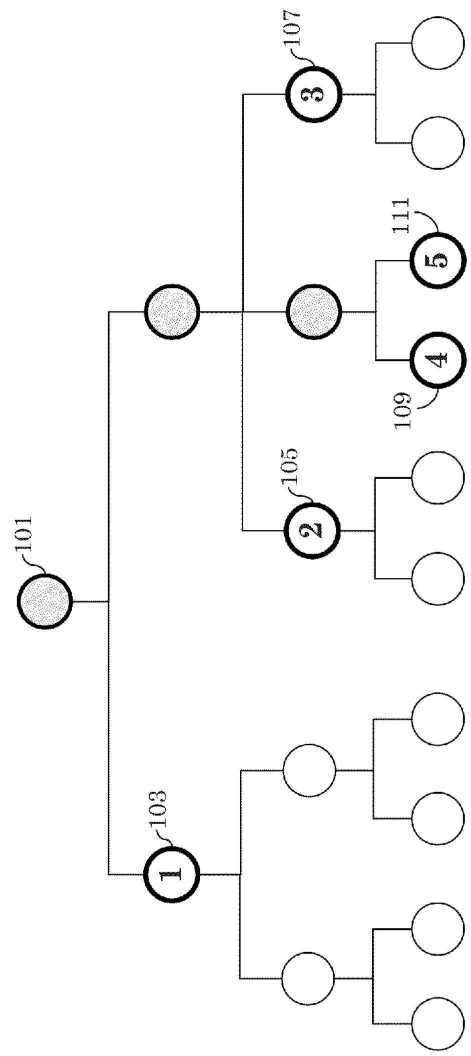
FIG. 15 illustrates the concept of top-down node harvesting.

Detector's performance (detection rate (DR) and False Alarms (FA)) on the evaluation set The concept of top-down node harvesting is illustrated in FIG. 15. Starting from the root node 101, If a node does not converge (illustrated by a darkening within the circle), then it will not be harvested and its sub-nodes will be trained. However, if does node converge (illustrated by a numeral within a thick-lined circle), then the node is harvested, and it will be used to construction of the descriptor. In the present example, nodes 103, 105, 107, 109 and 111 (respectively labelled 1-5) are nodes that converge, and they are therefore harvested from the dendrogram (i.e., tree). This process stops when there are no more nodes to be split.

In investigating this approach, the following observations were made:

If shape variance in one node is too big, the detector needs to tolerate a large variance in view angles and environments (illumination, materials, clutter background, etc.), and the training of the node will likely not converge. Overall performance of the node will likely be poor with either too many false alarms or too low a detection rate.

If the negative samples are too similar to the target object, it is very difficult to achieve convergence in the training. For example, a cutter blade that has a rectangle shape is very difficult to detect since there are many negative samples containing man-made objects having a similar rectangle shape.

Contrast is one of the key factors that affect the discriminative power of features. If a feature at contour has high contrast in all positive samples, the feature becomes more discriminative or has more tolerance to variances.

If a node has poor performance, the node may have to be split into sub-nodes. The sub-nodes cover less view ranges and shape variances. As a result, the more features that the limited view range has in common, the easier the training will be (higher DR and lower FA will be achieved)

Criteria of 'Convergence' and 'Acceptable' level of FA depend on object, negative samples and run-time constraints.

Training resolution. Using high resolution of positive samples in training improves the discriminative power of features due to more detailed and finer features being available. However this requires that the system scan at high resolution, which may not meet some run-time constraints. If time is limited, then lower resolution sample images may be rendered/accessed.

Pruning by occurrence. It was found that some nodes are very difficult to train, however these nodes may be eliminated from the evaluation set. For example, in a given test, one could pick 3 nodes to achieve the same DR and much lower FA from 8 harvested nodes for a given target object.

Figure 16:
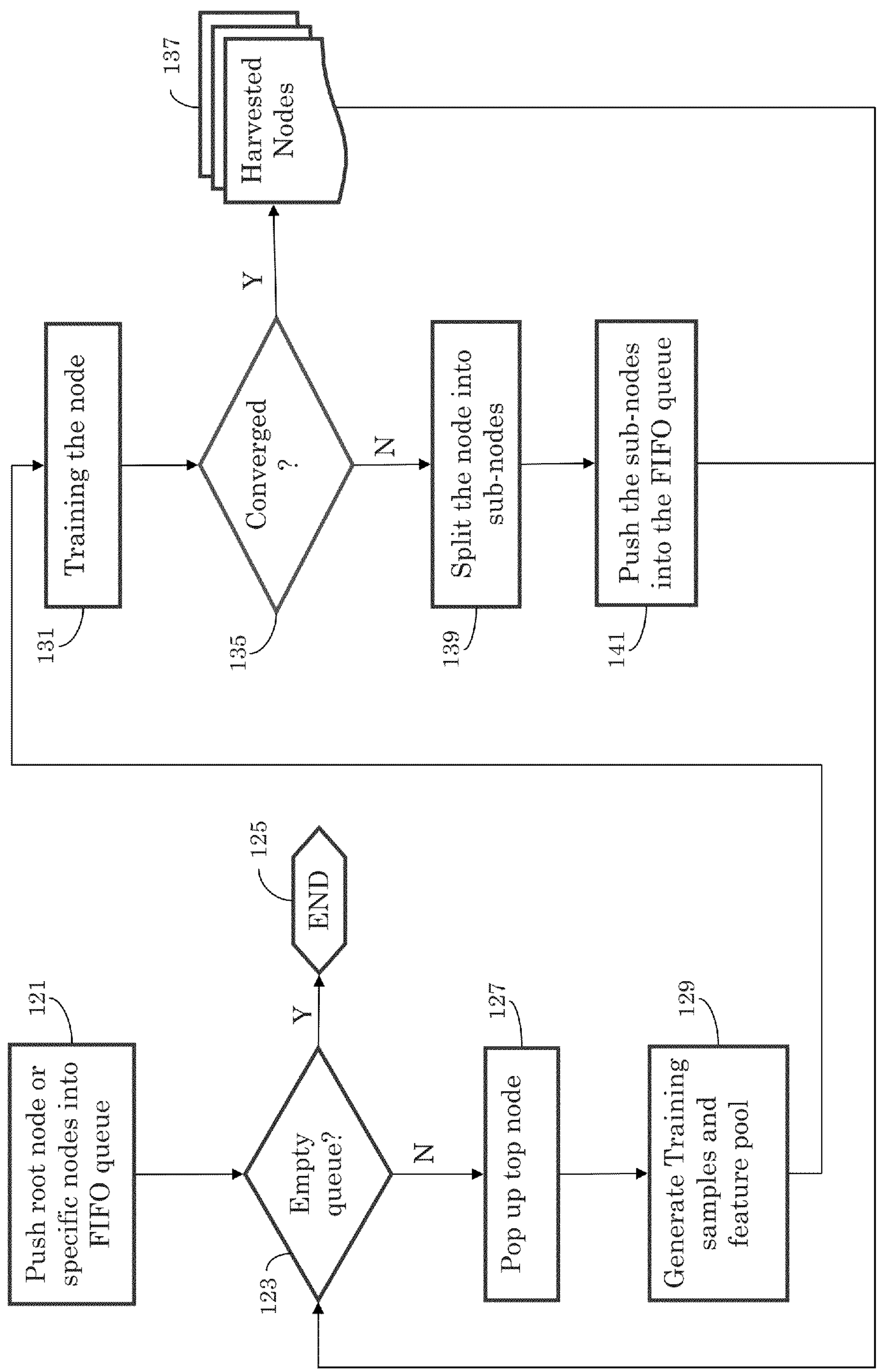
FIG. 16 describes the steps of top-down node harvesting.

The steps of top-down node harvesting are described in reference to FIG. 16. Starting at a current root node relative to a specific number of nodes (for example four 4 nodes), step 121 pushes the current root node or a specific number of nodes into a FIFO queue.

Step 123 checks if the FIFO queue is empty, and if it is (step 123=Y) then the process ends at step 125. However, if the FIFO queue is not empty (step 123=N), then step 127 pops (i.e., accesses) the top node in the FIFO queue, and step 129 generates (i.e., renders) training samples and a feature pool. These training samples may be positive samples.

The node is then trained in step 131. If the node converged in training (step 135=Y), then in step 137 the node is harvested, the stage log is recorded, and processing returns to step 123 to access the next node in the queue, if any. However if the node does not converge (step 135=N), then step 139 splits the node into sub-nodes and step 141 pushes the sub-nodes into the FIFO queue. Processing then returns to step 123 to access the next node in the queue, if any.

Figure 17:
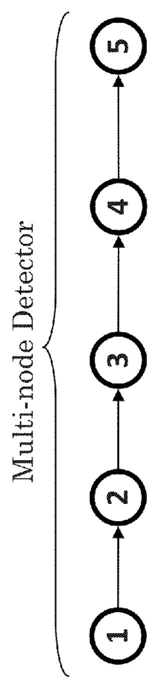
FIG. 17 shows the combining, by sequential coupling, of enumerated harvested nodes 1-5 to create a multi-node detector.

Once the harvesting of the nodes is finished, the harvested nodes (or a selection of these harvested nodes) are combined sequentially to form a detector. This is illustrated in FIG. 17, where enumerated harvested nodes 1-5 coupled in a sequential combination to create a multi-node detector.

Experimental Example

An experiment for construction of a multiple node detector of a test object (identified as ID3174) was implemented. The construction may follow the following steps:

1. Simulate (i.e., render in a manner described above) basic view images (selecting CAD model, distance or z, x=y=0, resolution (e.g. VGA 640×480), camera parameters or projection matrix, number of views, and/or limited view ranges, object material, and/or lighting etc.). In the present example, 66 basic views were used.

2. Once the basic views are simulated (66 view in the present example), image normalization is applied. There are many image normalization methods. For example, the object may be aligned by model registration. However due to its simple implementation, moment-based image normalization was used so that the images of the test object from different views were aligned to the object centroid and orientation was aligned to the Eigen axis of moments.

3. After normalizing the basic views, the distance or similarity between the basic views is measured, preferably by HOG distance. In the present example, the HOG feature calculation used the parameter of 8×8 cells and 9 orientations. Therefore, the size-normalized image was selected to be a multiple of 16 so that the 8×8 cell partition would keep the window center at the 8×8 block image's center. In the present example, the height and width of the window was divisible by 16.

4. Once the distance between views is calculated, the cropped template from the normalized image can be any size, but the window center should be aligned to the normalized image center. For example, 64×64 was used for normalized-image and HOG distance calculation, and the scanning window size was 56×40. The positive training samples are cropped from the normalized images.

5. Then feature pools are generated. The positive samples are generated for a given cluster or node.

6. The feature pool and positive samples are copied to the trainer's specific folders and setting training parameters (control and configuration) files, and training can then be executed. Any number of known training methods may be used.

7. Negative samples are specified in a settings file.

8. With the training finished, check if FA of training per stages meets the 'Convergence' conditions (for example, FA<1.5*Target FA). For example, the Target FA may be set to 0.01, 0.05 and 0.05 in the control file for three stages of training. If the training summary file shows that the training does not converge, then the node should be split into two sub-nodes and the sub-nodes are then trained and checked for convergence. If the training of a node converges, then the training output should be copied to a stage log.

9. Repeat step 5 to 7 until all nodes are trained and/or converged.

10. Put (i.e., copy or move) the stage log of converged nodes into folders 0, 1, 2, and so on, in sequence, and use the merge node executable to merge the multiple nodes into one StgLog.

11. Run the detector on an evaluation set using the merged multiple node StgLog.

For object ID3174, the following experimental conditions were tested:

6 nodes using 3-stage training with FA: 0.01, 0.05, 0.1 and WC: 5, 10, 15

8 nodes using 3-stage training with FA: 0.01, 0.05, 0.05 and WC: 5, 10, 15.

The convergence condition is FA/TFA<1.5.

The results of this experimental test (with manual training and with automatic training) are tabulated in the tables of FIG. 18.

Compared to manually constructed multiple nodes detectors, the automated multiple node detectors described in this experiment achieved a similar DR as the manual multiple nodes.

The number of multiple nodes depends on the detector's performance. A user may have to adjust training resolution, criteria of 'Convergence', training parameters for the trainer, positive and negative samples and 'Acceptable' level of FA so that the number of multiple nodes will be changed to achieve desired performance on evaluation set. If a node tolerates too much variance, then its related features may become too weak to distinguish the target object from other objects or background, and a high FA may occur (if high DR is required). If a node tolerates a very small amount of variance, then more "distinguished" features can be extracted. Ideally, if there is no run-time limitation, more nodes are better in terms of higher DR and lower FA. However, too many nodes will slow down the detection phase (for example, one node may require 5-8 ms to scan a QVGA (160×120) image, and 8 nodes may require 40-60 ms to scan the image.) In addition, the training time for multiple nodes may be cumulative. Since the detector's performance includes both detection rate (DR) and false alerts (FA), users have to compromise to an "Acceptable" level of false positive in order to achieve a high DR with the constraints of "real-time" for run-time. Moreover, the training time should be considered for multiple nodes.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

What is claimed is:

1. A system for generating a computer vision solution for a specified vision task, the system comprising:

an input configured to receive user-defined limitations, wherein said user-defined limitations include at least one search criterion selected from a list of predefined search criteria and a vision task operation selected from a predefined list of vision task operations, the selected vision task operation being said specified vision task, wherein at least one of said user-defined limitations is associated with a sub-set of user-selectable and predefined descriptors within a library of predefined descriptors, each of said predefined descriptors being associated with a respective set of predefined search constraints, and each search constraint identifying an associated predefined classifier; and a processor configured to perform the following steps:

for each user-defined limitation that is associated with said library of predefined descriptors, offering for user-selection and accepting user selections of the available descriptors within its associated sub-set of predefined descriptors that are consistent with all user-defined limitations;

defining a working image library of sample images based on the user-defined limitations and the sets of image constraints associated with the selected descriptors;

defining an evaluation set of sample images from said working image library;

defining a vision solution candidate based on the user-defined limitations and a selection of the predefined classifiers associated with the selected descriptors, the selection of predefined classifiers being limited to predefined classifiers that do not conflict with any of the selected descriptors;

evaluating the vision solution candidate using said evaluation set of sample images and user-provided limitations, including accuracy and speed limitations;

if the accuracy and speed limitations are met, then defining the vision solution candidate as said computer vision solution.

2. The system of claim 1, further including:

defining a training set of sample images from said working image library and excluding any sample images in said evaluation set of sample images;

tuning said vision solution candidate, including retraining the selection of predefined classifiers using the training set of sample images, modifying the selected descriptors, and modifying the selection of corresponding predefined classifiers for selected descriptors; and using evaluation feedback for additional tuning of the selected solution candidate until the accuracy and speed limitations are met or a maximum of additional tuning is reached.

3. The system of claim 2, wherein tuning said vision solution candidate further includes receiving user-submitted changes to the selection of descriptors.

4. The system of claim 2, wherein the tuning of said vision solution candidate further includes creating additional new classifiers.

5. The system of claim 2 wherein:

IF the maximum of additional training is reached without meeting the accuracy and speed requirements, THEN defining a new vision solution candidate by changing the selected descriptor of at least one user-defined limitation with another descriptor from its associated sub-set of predefined descriptors OR defining a new associated descriptor by a combination of existing descriptors selected from its associated sub-set of predefined descriptors.

6. The system of claim 1, further defining a training set of sample images from said working image library and excluding any sample images in said evaluation set of sample images, wherein:

at least one of said user-defined limitations requires the creation of a new classifier;

the new classifier is automatically trained using the training set of sample images, the evaluation set of sample images, and user-defined inputs; and the defining of said vision solution candidate is further based on the new classifier.

7. The system of claim 6 wherein the automatic training of the new classifier includes creating a histogram of feature descriptors and defining cluster features, harvesting the nodes of the histogram that converge during training, and collecting the harvested nodes into a detector, said detector defining said new classifier.

8. The system of claim 1 wherein said user-defined limitations comprises an object type selectable from a list of predefined object types, and operating conditions of a system in which the computer vision solution is to be implemented.

9. The system of claim 8 wherein the working image library is based on one computer generated images of the object type and computer generated image backgrounds.

10. The system of claim 1 wherein defining said working image library includes:

obtaining information on:

object characteristics and parameters corresponding to each object characteristic;

scene characteristics and parameters corresponding to each scene characteristic;

camera characteristics;

parameter domains for the object characteristics scene characteristics, and camera characteristics; and a target sampling schema by selecting a sampling type and a distribution type;

wherein at least a portion of the above information is obtained from the sets of image constraints associated with the selected descriptors;

generating a plurality of sample configurations according to the target sampling schema using the parameter domains;

for each sample configuration:

performing 3D rendering of the scene using computer graphics, and generating a sample 2D image based on the rendering; and creating a data set including at least some of the following for each sample configuration:

image information from the generated sample 2D image and optional 3D information when available;

parameters of the sample configuration, and target object data.

11. The system of claim 10 wherein the characteristics of the object include one or more of an object model, a reflectance model based on object material, surface texture and uniformity characteristics, and depth edge information.

12. The system of claim 10 wherein the characteristics of the scene include one or more of images of preferred background, viewing directions, positions and orientations of an object, camera and light sources in the scene, and a model of a lighting environment.

13. The system of claim 10 wherein the characteristics of the camera include one or more of a model of the camera, and intrinsic and extrinsic calibration parameters of the camera.

14. The system of claim 10 wherein the sampling type includes one or more of linear and random, and the distribution type includes one or more of linear and Gaussian.

15. The system of claim 10 wherein the computer graphics include one or more of ray tracing and application program interface (API) for defining two-dimensional and three-dimensional graphic images.

16. The system of claim 10 wherein the parameters of the sample configuration include one or more of location of objects in the scene, orientations of objects in the scene, locations of light sources, and camera distance.

17. The system of claim 10 wherein the target object data includes one or more of a bounding area outlining the target object in the 2D image, an object 2D mask, and area of the target object occluded by other objects.

18. The system of claim 1 wherein the defining of said working image library of sample images comprises:

acquiring a seed image of an object;

rotating the seed image to generate a first rotated image;

labeling the object in the first rotated image;

rotating the first rotated image through a range of rotation angles to generate a plurality of additionally rotated images; and labeling the object in the additionally rotated images based on the label of the object in the first rotated image.

19. The system of claim 18 further comprising at least one of blurring, brightening, darkening, and adding noise to the first rotated image in accordance with the sets of image constraints associated with the selected descriptors.

20. One or more tangible, non-transitory computer-readable media embodying instructions executable by a computer to perform a method for automatically generating a computer vision solution, the method comprising:

providing a user-selectable list of predefined search criteria, at least one search criterion in said user-selectable list having an associated sub-set of predefined descriptors, each predefined descriptor being associated with a respective set of search constraints, and each search constraint identifying an associated predefined classifier;

in response to a user selection of the predefined search criterion that has an associated sub-set of predefined descriptors, providing for user-selection the associated sub-set of predefined descriptors;

receiving user input for selection of one or more of said predefined descriptors;

creating a training set of object images and an evaluation set of object images that incorporate the selected predefined descriptors;

selecting a vision solution candidate that provides a best match to the selected predefined descriptors and the search criteria from a predefined library of predefined classifiers, the selected classifiers including classifiers having a pre-established correspondence with the selected predefined descriptors;

training the selected solution candidate using the training set;

applying the trained, selected solution candidate to the evaluation set;

evaluating the selected solution candidate solution using at least part of the user-selected predefined search criteria; and using evaluation feedback loops for additional training of the selected solution candidate until accuracy and speed requirements are met or a maximum of additional training is reached, wherein for each additional training of each feedback loop, the selection of predefined classifiers from said predefined library of predefined classifiers is altered.

* * * * *